(12) United States Patent
Wan

(10) Patent No.: US 7,649,634 B2
(45) Date of Patent: Jan. 19, 2010

(54) METHODS AND SYSTEMS FOR WHITE LIGHT INTERFEROMETRY AND CHARACTERIZATION OF FILMS

(75) Inventor: Der-Shen Wan, Tucson, AZ (US)

(73) Assignees: Mountain View Optical Consultant Corp., Tucson, AZ (US); Good Advance Industries (H.K.) Limited, Central Hong Kong (CN)

(*) Notice: Subject to any disclaimer, the term of this patent is extended or adjusted under 35 U.S.C. 154(b) by 266 days.

(21) Appl. No.: 11/928,625

(22) Filed: Oct. 30, 2007

(65) Prior Publication Data

US 2009/0109444 A1    Apr. 30, 2009

(51) Int. Cl.
G01B 9/02 (2006.01)

(52) U.S. Cl. ..................................... 356/504

(58) Field of Classification Search ............... 356/479, 356/497, 504, 511–515
See application file for complete search history.

(56) References Cited

U.S. PATENT DOCUMENTS

| 5,194,918 | A  | 3/1993  | Kino et al.     |
| 5,398,113 | A  | 3/1995  | de Groot        |
| 5,633,715 | A  | 5/1997  | Ai et al.       |
| 5,920,394 | A  | 7/1999  | Gelbart et al.  |
| 6,989,905 | B2 | 1/2006  | DeGroot         |
| 7,106,454 | B2 | 9/2006  | de Groot et al. |
| 7,119,909 | B2 | 10/2006 | Unruh et al.    |
| 7,271,918 | B2 | 9/2007  | DeGroot et al.  |

FOREIGN PATENT DOCUMENTS

| TW | I237685 | 8/2005  |
| TW | I242635 | 11/2005 |

OTHER PUBLICATIONS

Grievenkamp, "Generalized Data Reduction for Heterodyne Interferometry", Opt. Eng., 23, 350 (1984); 3 pages.

(Continued)

*Primary Examiner*—Hwa S Lee (Andrew)
(74) *Attorney, Agent, or Firm*—Davis Wright Tremaine LLP; David H. Deits; Heather M. Colburn

(57) ABSTRACT

Methods are provided for estimating a surface profile of a sample in an interferometer having a broad bandwidth light source. The interferometer detects interference pattern intensity data over a series of frames of a relative scan between the sample and a reference surface. Particular methods comprise, for each location (x,y) of interest on the sample: determining an envelope of the detected interference pattern intensity data corresponding the location (x,y) of interest based on amplitudes of the detected interference pattern intensity data; determining a rough estimate $z_{rough}$ of the surface profile of the sample at the location (x,y) of interest based on the envelope; estimating a phase offset θ of the detected intensity data using a curve fitting optimization process to fit the detected intensity data to a broad bandwidth interference model; and refining the rough estimate $z_{rough}$ of the surface profile using the phase offset θ to obtain a fine estimate $z_{fine}$ of the surface profile of the sample at the location (x,y) of interest, the fine estimate $z_{fine}$ having improved resolution over the rough estimate $z_{rough}$. Similar methods are used for characterizing films applied to substrates.

25 Claims, 12 Drawing Sheets

OTHER PUBLICATIONS

Vanesse et al., "Fourier Spectroscopy", Progress in Optics V (1965), (North Holland pub.co.) pp. 292-293; 1 page.

Larkin, "Efficient nonlinear algorithm for envelope detection in white light interferometry," J. Opt. Soc. Am. A 13, 832-843 (1996); 12 pages.

Sandoz et al., "Unambiguous profilometry by fringe-order identification in white-light phase shifting interferometry," J. Mod. Opt. 44, 519-534 (1997); 8 pages.

Tolansky, An introduction to Interferometry (Longman Group Limited, London, 1973), pp. 210-211; 1 page.

Birch et al., "Dispersion Fourier Transform spectrometry," in Infrared and Millimeter waves, II (Academic Press, New York, 1979), pp. 184-185; 1 page.

Pavlicek et al., "Measurement of the influence of dispersion on white-light interferometry," Appl. Opt. 43, 766-770 (2004); 5 pages.

de Groot et al., "Surface profiling by analysis of white-light interferograms in spatial frequency domain," J. Mod. Opt. 42, 389-401 (1995); 6 pages.

Grievenkamp, "Phase Shifting Interferometry" summarized in Optical Shop Testing, 2nd Edition, John Wiley & Sons 1991, pp. 522-524; 4 pages.

METHODS AND SYSTEMS FOR WHITE LIGHT INTERFEROMETRY AND CHARACTERIZATION OF FILMS

TECHNICAL FIELD

This invention relates to white light interferometry. Particular embodiments of the invention relate to measurement of various surface characteristics and characteristics of films.

BACKGROUND

Prior art techniques for white light-based interferometry exhibit a number of issues. By way of non-limiting example, as described in more particular detail below, these issues include undesirably low resolution and consumption of undesirably large amounts of time and/or processing resources.

There is a general desire to improve current techniques for implementing white light-based interferometry.

SUMMARY

One particular aspect of the invention provides a method for estimating a surface profile of a sample in an interferometer having a broad bandwidth light source. The interferometer detects interference pattern intensity data over a series of frames of a relative scan between the sample and a reference surface. The method comprises, for each location (x,y) of interest on the sample: determining an envelope of the detected interference pattern intensity data corresponding the location (x,y) of interest based on amplitudes of the detected interference pattern intensity data; determining a rough estimate $z_{rough}$ of the surface profile of the sample at the location (x,y) of interest based on the envelope; estimating a phase offset $\theta$ of the detected intensity data using a curve fitting optimization process to fit the detected intensity data to a broad bandwidth interference model; and refining the rough estimate $z_{rough}$ of the surface profile using the phase offset $\theta$ to obtain a fine estimate $z_{fine}$ of the surface profile of the sample at the location (x,y) of interest, the fine estimate $z_{fine}$ having improved resolution over the rough estimate $z_{rough}$.

Another aspect of the invention provides a method for characterizing a sample comprising a film applied to a substrate in an interferometer having a broad bandwidth light source. For each location (x,y) of interest on the sample, the method comprises: detecting interference pattern intensity data over a series of frames of a relative scan between the sample and a reference surface; and determining a combined envelope of the detected intensity data based on amplitudes of the detected intensity data, the combined envelope comprising a combination of: a R interference pattern corresponding to light reflected from an exposed surface of the film; and a T interference pattern corresponding to light reflected from an interface between the substrate and the film. Once the combined envelope is determined, the method comprises: ascertaining a frame $m_{max}$ corresponding to a maximum of the combined envelope; using the frame $m_{max}$ to determine: a processing window, the processing window comprising a plurality of frames in the range $[m_{max}-\Delta_1, m_{max}+\Delta_2]$, where $\Delta_1$ and $\Delta_2$ comprise integer numbers of frames; and a processing window envelope, the processing window envelope corresponding to the combined envelope in the processing window and having a value of zero outside of the processing window. The method then involves determining, based on the processing window envelope, an estimate $z_{dom}$ of a surface profile at the location (x,y) of interest; estimating an average surface profile $z_{ref,avg}$ of a reference surface of the substrate, the reference substrate surface located away from the film; and determining an absolute value of the difference between the estimate $z_{dom}$ of the surface profile and the average surface profile $z_{ref,avg}$ of the reference substrate surface and using the absolute value to estimate a thickness $t(x,y)$ of the film at the location (x,y) of interest.

In some embodiments, the method may also comprise: estimating a phase offset $\theta_{dom}$ of a portion of the detected intensity data corresponding to the frames of the processing window envelope using a curve fitting optimization process to fit the portion of the detected intensity data corresponding to the frames of the processing window envelope to a broad bandwidth interference model; unwrapping the phase offset $\theta_{dom}$ to remove a $2\pi$ ambiguity therefrom and to obtain an unwrapped phase offset; and refining the estimate $z_{dom}$ of the surface profile using the unwrapped phase offset to obtain a fine estimate $z_{dom,fine}$ of the surface profile at the location (x,y) of interest, the fine estimate $z_{dom,fine}$ having improved resolution over the rough estimate $z_{dom}$.

Another aspect of the invention provides a method for characterizing a sample comprising a film applied to a substrate in an interferometer having a broad bandwidth light source. For each location (x,y) of interest on the sample, the method comprises: detecting interference pattern intensity data over a series of frames of a relative scan between the sample and a reference surface; and determining a combined envelope of the detected intensity data based on amplitudes of the detected intensity data, the combined envelope comprising a combination of: a R interference pattern corresponding to light reflected from an exposed surface of the film; and a T interference pattern corresponding to light reflected from an interface between the substrate and the film. After determining a combined envelope, the method involves: ascertaining a frame $m_{max}$ corresponding to a maximum of the combined envelope; using the frame $m_{max}$ to determine: a processing window, the processing window comprising a plurality of frames in the range $[m_{max}-\Delta_1, m_{max}+\Delta_2]$, where $\Delta_1$ and $\Delta_2$ comprise integer numbers of frames; and a processing window envelope, the processing window envelope corresponding to the combined envelope in the processing window and having a value of zero outside of the processing window. The method then comprises: determining, based on the processing window envelope, a first estimate $z_{dom}$ of a surface profile at the location (x,y) of interest; fitting the processing window envelope to a Gaussian function; subtracting the Gaussian function from the combined envelope to determine an intermediate envelope; determining, based on the intermediate envelope, a second estimate $z_{int}$ of a surface profile at the location (x,y) of interest; and determining a difference between the first estimate $z_{dom}$ and the second estimate $z_{int}$ and using the difference to estimate a thickness $t(x,y)$ of the film at the location (x,y) of interest.

In some embodiments, the method may also comprise: estimating a phase offset $\theta_{dom}$ of a portion of the detected intensity data corresponding to the frames of the processing window envelope using a curve fitting optimization process to fit the portion of the detected intensity data corresponding to the frames of the processing window envelope to a broad bandwidth interference model; unwrapping the phase offset $\theta_{dom}$ to remove a $2\pi$ ambiguity therefrom and to obtain an unwrapped phase offset; and refining the estimate $z_{dom}$ of the surface profile using the unwrapped phase offset to obtain a fine estimate $z_{dom,fine}$ of the surface profile at the location (x,y) of interest, the fine estimate $z_{dom,fine}$ having improved resolution over the rough estimate $z_{dom}$.

Other aspects of the invention provide computer program products comprising computer instructions which, when executed by a processor, cause the processor to carry out the methods of the invention.

Other features and aspects of specific embodiments of the invention are described below.

BRIEF DESCRIPTION OF THE DRAWINGS

In drawings which depict non-limiting embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Aspects of the invention provide methods of estimating surface profiles using white light interferometers which take interferogram phase information into account using curve fitting optimizations in the spatial domain. Other aspects of the invention provide methods for characterizing films applied to substrates which separate the envelopes of interferogram components from one another using a thresholding process.

Figure 1:
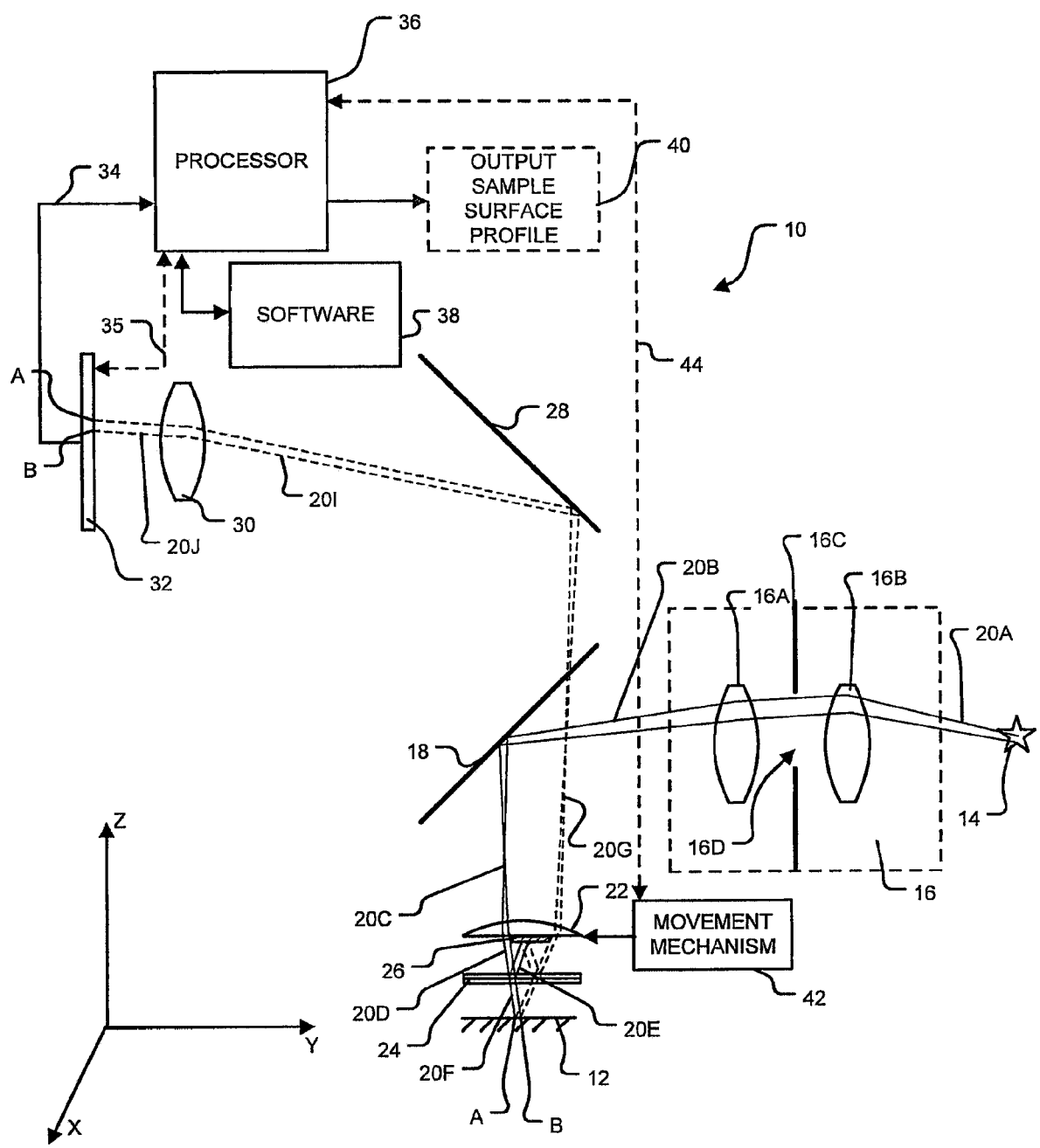
FIG. 1 schematically depicts a white light interferometric microscope suitable for application of the methods and systems of the invention.

FIG. 1 schematically depicts a white light interferometric microscope 10 suitable for application of the methods and systems of the invention. Interferometer 10 may be used to characterize sample 12. Such characterization may include, for example, obtaining information about the profile of sample 12 in the z dimension (see x, y, z axes illustrated in FIG. 1). The profile of sample 12 may include a height (z dimension) estimate for each of a series of points (x, y) on sample 12.

Interferometer 10 comprises a white (or other incoherent) light source 14. In this description, the term white light is used to describe electromagnetic radiation that is generally incoherent (i.e. has a relatively short coherence length or a correspondingly broad frequency spectrum). By way of non-limiting example, white light may comprise wavelength components that span the range of 400-700 nm (i.e. frequency components that span the range of $4.3\times10^{14}$-$7.5\times10^{14}$ Hz). By way of non-limiting example, white light source 14 is implemented using one or more incandescent light sources (e.g. tungsten halogen lamp) or one or more LED sources, In general, it is preferable that incoherent light source 14 have a wavelength spectrum of 75 nm or greater. In some embodiments, incoherent light source 14 has a wavelength spectrum of 200 nm or greater.

Light 20A from light source 14 is collected by illumination optical system 16 and directed toward beam splitter 18 as light 20B. In the schematic FIG. 1 illustration, illumination optical system 16 comprises a pair of lens systems 16A, 16B and a barrier 16C having an aperture 16D which is used to select the illumination area on sample 12 and to block stray light to enhance image contrast. It will be understood by those skilled in the art that optical system 16 may comprise additional optical components, may comprise fewer optical components or may be suitably implemented using different optical components. The optical components of system 16 may generally comprise any optical components and are not limited to the components shown in the illustrated embodiment.

In the illustrated interferometer 10, beam splitter 18 receives light 20B from illumination optical system 16. A portion of light 20B is reflected by beam splitter 18 as light 20C which is directed toward objective lens 22. In the illustrated embodiment, objective lens 22 comprises a single focusing lens, but this is not necessary. In some embodiments, objective lens 22 may comprise a plurality of lenses and possibly other optical components. Objective lens 22 receives light 20C and outputs light 20D which illuminates sample 12 and reference surface 26.

Light 20D encounters beam splitter 24 which reflects a portion of light 20D as light 20E and transmits a portion of light 20D as light 20F. Reflected light 20E impinges on reflective surface 26, where it is reflected back toward objective lens 22 and the imaging components 28, 30, 32 discussed further below. Reflective surface 26 may be referred to as reference surface 26. Preferably, reference surface 26 is a high quality optical surface with a highly smooth, reflective surface. Transmitted light 20F impinges on sample 12 where a portion of it is reflected back toward objective lens 22 and the imaging components 28, 30, 32 discussed further below.

Light 20G traveling back through objective lens 22 contains light 20E reflected from reference surface 26 (referred to as reference light 20E) and light reflected from sample 12 (referred to as sample light 20F). For any single point on a surface of sample 12 surface and its corresponding point on reference surface 26, there are many pairs of rays like 20F and 20E. Each such pair of rays has its own contribution to the interference for this point on sample 12. With a suitable illumination design (e.g. Kohler illumination) and selection of proper light source 14, the interferometer 10 has very high contrast interference fringes superimposed on conventional microscope images.

Light 20G is directed toward an imaging system which, in the illustrated embodiment, comprises mirror 28, imaging optics 30 and sensor 32. Light 20G is reflected from reflective surface 28 as light 20I and directed toward imaging optics 30. In the illustrated embodiment, imaging optics 30 are shown as a single lens, but this is not necessary. In general, imaging optical system 30 may comprise a plurality of lenses and may comprise other suitable optical components. Light 20I received by imaging optical system 30 is transmitted as light 20J toward sensor 32. Sensor 32 may comprise an array of pixels, each pixel comprising one or more individual sensors (e.g. CCD sensors and/or CMOS sensors—not explicitly shown) which are capable of detecting the intensity of light 20J received thereon and outputting corresponding signals 34 representative of the light intensity received at their corresponding pixel. Sensor 32 may comprise a digital camera or the like which includes some of its own imaging optics (not shown) and some of its own signal processing electronics (not shown).

In the illustrated embodiment, sensor 32 is connected to provide measured intensity data 34 to processor 36. Although intensity data 34 is shown as a single line in the schematic depiction of FIG. 1, it will be appreciated by those skilled in the art that intensity data 34 represents the intensity detected by each individual pixel in sensor array 32. In some embodiments, suitable signal processing electronics (not explicitly shown) may be connected between sensor 32 and processor 36. By way of non-limiting example, such signal processing electronics may include amplifiers, analog to digital conversion electronics, driver circuits, filters, buffers, signal conditioning electronics and the like. Processor 36 may be part of a suitably configured computer system (not shown) or may be part of an embedded interferometry system. Processor 36 shown schematically in FIG. 1 may comprise more than one individual data processor which may be centrally located and/or distributed. As is known in the art, processor 36 preferably comprises internal memory and/or has access to external memory (not shown).

Processor 36 is programmed with or otherwise has access to software 38. As explained in more detail below, processor 36 executes software 38 which causes processor 36 to process intensity data 34 and to generate information 40 about the surface profile of sample 12. Processor 36 may also control the operation of sensor 32 using control signal 35.

Figure 2A:
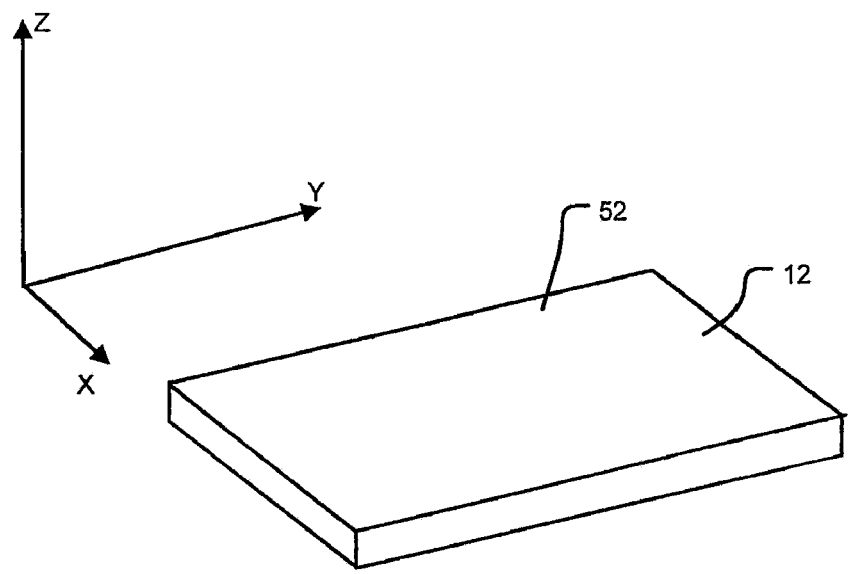
FIG. 2A schematically depicts a sample surface which may be characterized using the FIG. 1 interferometer.

FIG. 2A schematically depicts a non-limiting example of a typical sample 12 which may be characterized using interferometer 10. The illustrated sample 12 of FIG. 2 has a surface 52 which, from a macroscopic perspective, is generally planar in the x-y plane. However, the profile (i.e. the height in the z dimension) of surface 52 typically exhibits microscopic variations.

In operation, relative movement is introduced between sample 12 and reference surface 26 in the z direction to vary the relative optical path lengths of sample light 20F (reflected from surface 52 of sample 12) and reference light 20E. By way of non-limiting example, relative movement between sample 12 and reference surface 26 may be achieved by moving sample 12, a sample stage (not explicitly shown) to which sample 12 is mounted, reference surface 26 and/or objective lens 22 to which reference surface 26 may be mounted. In the illustrated embodiment, this relative movement is effected by a movement mechanism 42 which is suitably coupled for precision movement of objective lens 22 (and reference surface 26) in the z direction. By way of non-limiting example, movement mechanism 42 may comprise a piezo-electric actuator, a motor-operated mechanism, a hand-operated mechanism, or a mechanism incorporating one or more other suitable actuators. Processor 36 may control movement mechanism 42 via control signal 44. Suitable driver electronics (not explicitly shown) may be connected between processor 36 and movement mechanism 42. Movement mechanism 42 may also comprise a position sensor (not explicitly shown) which feeds position information back to processor 36 via control signal 44.

In the illustrated embodiment, processor 36 uses control signal 44 to cause movement mechanism 42 to move reference surface 26 in the z direction. While reference surface 26 is moving in the z direction, processor 36 uses control signal 35 to cause sensor 32 to capture intensity data 34. Processor 36 may control the relative z direction movement of reference surface 26 and the image capturing of intensity data 34 in a synchronous manner. For example, processor 36 may cause sensor 32 to capture intensity data 34 at a series of discrete times corresponding to discrete z locations of reference surface 26 (relative to sample 12). Such discrete times/discrete z locations may be referred to in this description as frames. For each frame, the optical path length of sample light 20F changes relative to the optical path length of reference light 20E. As discussed above, the resultant interference pattern has a high contrast when reference light 20E and sample light 20F have no path difference.

Figure 2B:
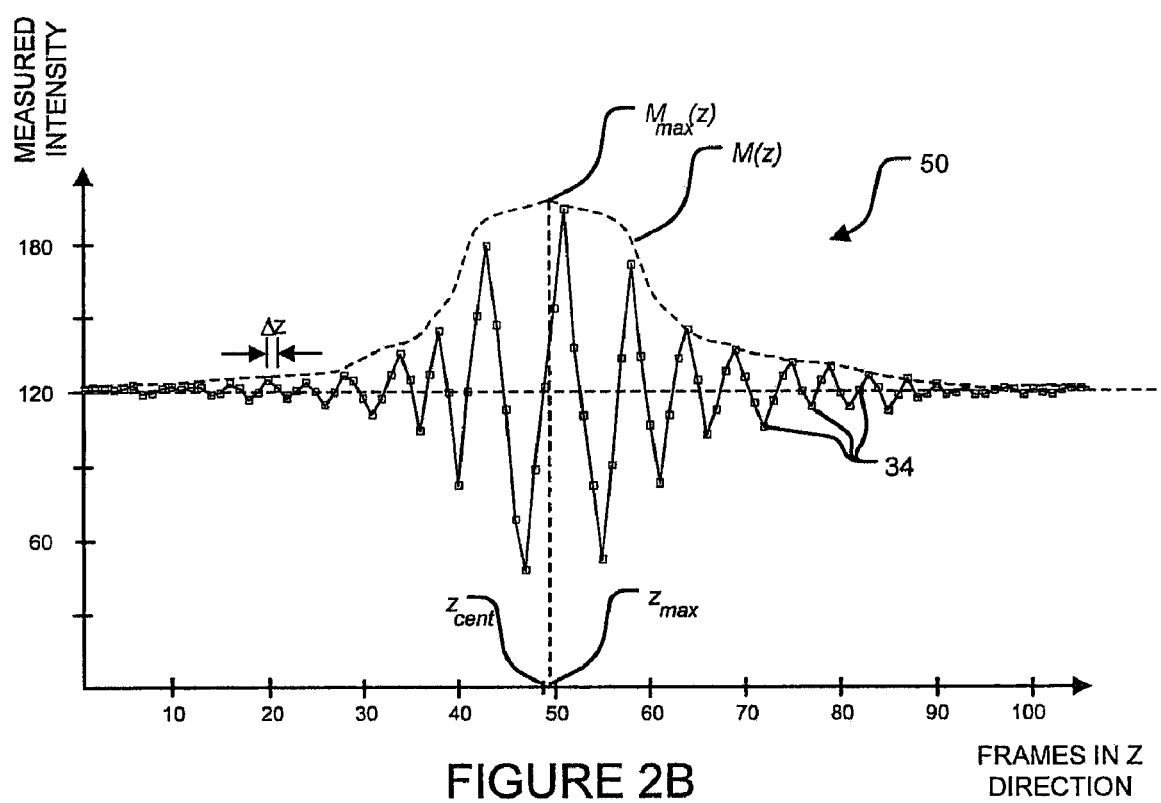
FIG. 2B schematically depicts intensity data for a particular location $(x, y)=(x_i, y_i)$ on the sample as measured by the sensor of the FIG. 1 interferometer for relative z direction movement between the reference surface and the sample.

FIG. 2B schematically depicts a plot 50 showing intensity data 34 for a particular location $(x, y)=(x_i, y_i)$ on surface 52 of sample 12. Intensity data 34 may be referred to as interference data, an interference signal or an interferogram. The FIG. 2B intensity data 34 is measured by sensor 32 as reference surface 26 is moved in the z direction (relative to sample 12) over a series of frames. In some embodiments, the location $(x, y)=(x_i, y_i)$ corresponds to a particular pixel in sensor 32. In plot 50, the individual measured values for intensity data 34 associated with each frame are shown as squares. A number of observations can be made about intensity data 34 shown in plot 50. Firstly, as anticipated, plot 50 exhibits relatively high intensity data 34 in a region between frames 30 and 70. Since intensity date 34 at a particular location $(x, y)=(x_i, y_i)$ is contributed to by many points from the light source and many corresponding wavelengths, these signals add to provide the best contrast (i.e. to form such high amplitude intensity) when the path difference between reference light 20E and sample light 20F is almost zero. Plot 50 also shows that there is a background light intensity $I_{bg}$ (referred to herein as a DC intensity $I_{bg}$). DC intensity $I_{bg}$ is detected by sensor 32 when the optical path difference between reference light 20E and sample light 20F is relatively large and there is no significant interference signal.

When the optical path lengths of sample light 20F reflected from a particular location $(x, y)=(x_i, y_i)$ on sample 12 and reference light 20E reflected from a corresponding location on reference surface 26 are equal, there will be maximum contrast in interference data 34 resulting in a corresponding maximum amplitude of intensity data 34. However, as shown in plot 50 of FIG. 2, the individual frames where intensity data 34 are measured have an inter-frame separation Δz.

Because of reasons such as the processing resources consumed by reducing the inter-frame separation Δz and the oscillatory nature and sensitivity to noise of the interference signal created by intensity data 34, it is not generally possible to sample intensity data 34 (in a single z direction scan) with sufficient accuracy to determine an accurate representation of the point at which the optical path lengths of sample light 20F and reference light 20E are equal. For example, it may be impractical, time consuming and/or expensive to store intensity data associated with a 640×480 pixel array for the 10,000 frames necessary to scan a 10 μm region with an inter-frame separation Δz=1 nm.

It is therefore desirable to process intensity data 34 of the type shown in plot 50 of FIG. 2B in such a manner as to be able to use intensity data 34 to estimate the z location where there is maximum contrast with an accuracy that is within the inter-frame separation Δz. The prior art discloses a number of techniques for estimating the z location corresponding to maximum contrast. Some of these prior art techniques involve obtaining an estimate for an "envelope" of intensity data 34 (FIG. 2B) and then obtaining an estimate of the maximum or the centroid of the envelope. An envelope $M_m(z)$ is shown as a dashed line in FIG. 2B. As shown in FIG. 2B, envelope $M_m(z)$ may bound intensity data 34. In some embodiments, envelope $M_m(z)$ may be related to the power spectrum of light source 14—e.g. envelope $M_m(z)$ may represent an estimate of the Fourier transform of the power spectrum of light source 14.

The prior art envelope-based techniques can be understood best by referring to a model of intensity data 34. Spatial domain intensity data 34 of plot 50 (FIG. 2B) may be represented by the following model:

$$I_m(x_i,y_i)=I_{bg}\{1+V(x_i,y_i)G_m(x_i,y_i)\cos[2\pi k_0(2m\Delta z)+\theta(x_i,y_i)]\} \quad (1)$$

where:
- m is a frame index (i.e. the frame number in the z direction) and m={1, 2, 2 ... N};
- $I_m(x_i, y_i)$ is the intensity data 34 at the $m^{th}$ frame for the location (x, y)=$(x_i, y_i)$ on sample 12;
- $I_{bg}$ is the background (DC) signal;
- $V(x_i, y_i)$ is the interferometer contrast for the location (x, y)=$(x_i, y_i)$ on sample 12 (usually a constant);
- $G_m(x_i, y_i)$ is the value of the intensity data envelope at the $m^{th}$ frame; and
- Δz is the inter-frame separation.

One envelope-based technique, disclosed in U.S. Pat. No. 5,194,918 (Kino et al.), which is hereby incorporated herein by reference, involves using a Hilbert transform. A Hilbert transform introduces a 90° phase shift into the transformed data. Accordingly, the cosine term of equation (1) becomes a sine term after Hilbert transformation. Thus, the spatially varying parts of the equation (1) model and its Hilbert transform are respectively:

$$I_{bg}\{V(x_i,y_i)G_m(x_i,y_i)\cos[2\pi k_0(2m\Delta z)+\theta(x_i,y_i)]\} \quad (1a)$$

and $$I_{bg}\{V(x_i,y_i)G_m(x_i,y_i)\sin[2\pi k_0(2m\Delta z)+\theta(x_i,y_i)]\} \quad (1b)$$

Therefore the coefficient $M_m=I_{bg}V(x_i,y_i)G_m(x_i,y_i)$ is the square root of the sum of the squares of (1a) and (1b). Since $I_{bg}V(x_i,y_i)$ may be treated as a constant in most cases, the envelope term $G_m(x_i,y_i)$ for each frame m is proportional to the coefficient $M_m$. The coefficient $M_m(x_i,y_i)$ may be referred to as the modulation coefficient or, because of its proportionality to $G_m(x_i,y_i)$, the coefficient $M_m(x_i,y_i)$ may also be referred to as the envelope.

Another envelope-based technique proposed by K. Larkin in "Efficient nonlinear algorithm for envelope detection in white light interferometry," J. Opt. Soc. Am. A 13, 832-843 (1996) which is hereby incorporated herein by reference. The Larkin envelope-based technique involves solving for $M_m=I_{bg}V(x_i,y_i)G_m(x_i,y_i)$ directly based on the assumption that $G_n(x_i,y_i)$ is relatively close to $G_m(x_i, y_i)$ for n=m−2, m−1, m+1, m+2 and estimating $M_m$ based on:

$$M_m(x_i,y_i)=\tfrac{1}{4}[4(I_{m-1}-I_{m+1})^2+(-I_{m-2}+2I_m-I_{m+2})^2]^{1/2} \quad (2)$$

Equation (2) is based on the assumption that the frame interval Δz is approximately ⅛ of the central wavenumber $k_0$ of light source 14.

Still another envelope-based technique is disclosed in U.S. Pat. No. 5,633,715 (Ai et al.) which is hereby incorporated herein by reference. The Ai et al. technique involves estimating the envelope using the square of the intensity of the spatial derivative (with respect to z) according to:

$$M_m(x_i,y_i)=[I'_m(x_i,y_i)]^2 \quad (3)$$

where $I'_m$ is the first derivative of $I_m$ with respect to z.

Once the envelope $M_m(x_i,y_i)$ is known, it may be maximized to find the value of $z_{max}$ where $M_m(x_i, y_i)$ has the greatest amplitude $M_{max}$. The z value $z_{max}$ represents an estimate of the z value associated with maximum contrast and therefore represents an estimate of the height of sample 12 at the location (x, y)=$(x_i,y_i)$. As mentioned above, the location (x, y)=$(x_i,y_i)$ on sample 12 may correspond to a pixel of sensor 32. It will be appreciated that with a single scan in the z direction, information (i.e. $z_{max}$) may be obtained for each of the pixels of sensor 32, thereby facilitating an estimate of the profile of sample 12.

Another technique for using the envelope $M_m(x_i, y_i)$ to determine a z value of maximum contrast for intensity data 34 involves computing the centroid of the intensity data 34. This centroid technique (which is also referred to as the center of mass technique) makes use of the centroid equation:

$$z_{cent}=\frac{\sum_m M_m m\Delta z}{\sum_m M_m} \quad (4)$$

where $z_{cent}$ is the centroid of the discrete envelope function $M_m(x_i, y_i)$. The z value $z_{cent}$ represents an estimate of the z value associated with maximum contrast and therefore represents an estimate of the height of sample 12 at the location (x, y)=$(x_i, y_i)$. Depending on intensity data 34, the centroid $z_{cent}$ may be different from the envelope maximum $z_{max}$ (as shown in FIG. 2). However, because the centroid measurement $z_{cent}$ is repeatable, it may be used to estimate the height of sample 12 at the location (x, y)=$(x_i, y_i)$ relative to the height of sample 12 at other (x, y) locations.

The resolution associated with a z dimension measurement of a high quality optical surface represents one indicator of the accuracy of an interferometric technique. To determine the resolution of an interferometric technique, sample 12 of FIG. 2A is provided with an exceptionally smooth surface 52 and the root mean square resolution (RMS(σ)) is computed according to:

$$RMS(\sigma) = \sqrt{\frac{\sum_{i=1}^{N}(z_i - z_{avg})^2}{N}} \quad (5)$$

where $z_i$ represents a height (z dimension) estimate for a particular location $(x, y)=(x_i, y_i)$ on surface 52 and $z_{avg}$ represents the average of the height estimates over N different locations (x, y).

Figure 3A:
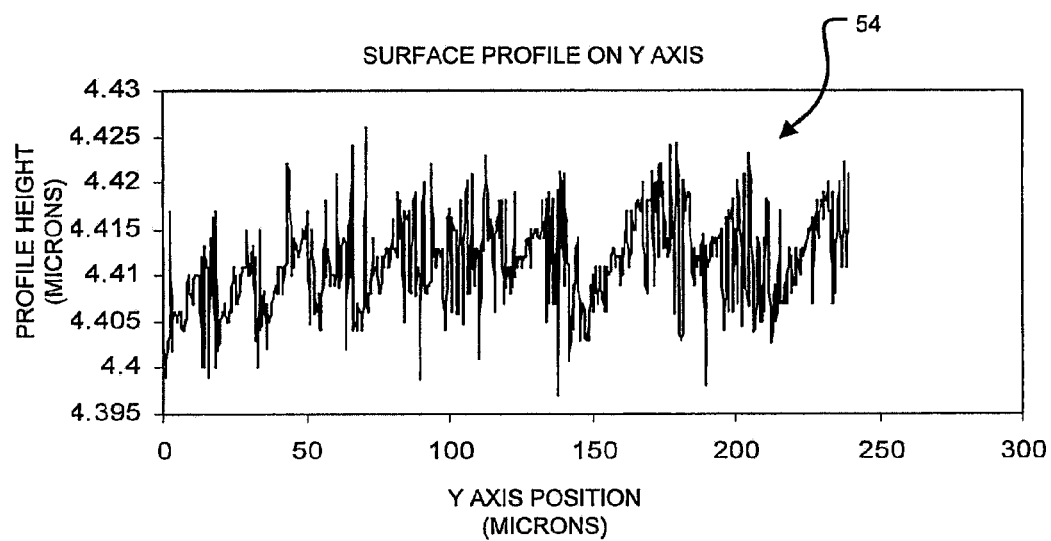
FIG. 3A is a plot which shows the profile height of the FIG. 3A sample along they direction as determined in accordance with prior art techniques which predict the profile height for a particular location $(x, y)=(x_i, y_i)$ using envelope magnitude information only.

FIG. 3A shows a plot 54 for a sample 12 having a high quality (i.e. smooth) optical surface 52. Plot 54 shows the height (z-dimension) of high quality optical surface 52 for various y positions along surface 52, where the height of surface 52 is determined using the Larkin envelope-based interferometric technique described above. Results similar to plot 54 of FIG. 3A are obtained using the other envelope-based techniques described above. FIG. 3A shows that the average height of high quality optical surface 52 is roughly 4.41 microns, but that the height of surface 52 varies over a range of approximately 4.395-4.425 microns. The resolution (RMS(σ)) of plot 54 is approximately 5 nm. This is typical of the resolution (RMS(σ)) of the prior art envelope-based interferometric techniques, which are limited to about 3-5 nm at best case.

While not wishing to be bound by theory, the inventor is of the view that the resolution limitations of the prior art envelope-based interferometric techniques arise because these techniques use only the amplitude information of intensity data 34 and do not account for phase information.

The model of equation (1) contains two phase quantities. A first phase quantity (referred to herein as the total phase (φ)) is represented by the argument of the cosine function:

$$\phi = 2\pi k_0(2m\Delta z) + \theta(x_i, y_i) \quad (6)$$

and a second phase quantity (referred to herein as the phase offset (θ)) is given by:

$$\theta = \theta(x_i, y_i) \quad (7)$$

Figure 3B:
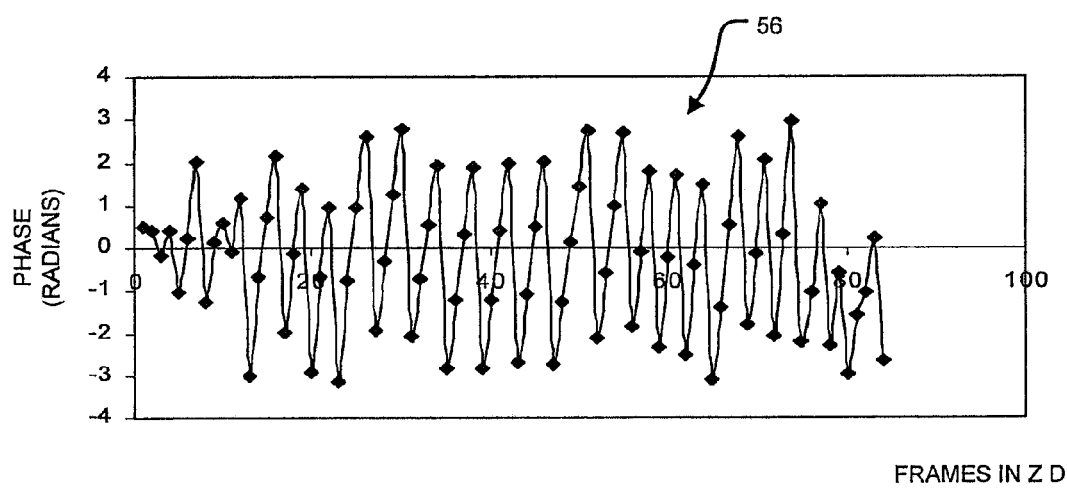
FIG. 3B is a plot showing the phase of the individual sample points of the FIG. 2B plot and evidencing the $2\pi$ phase ambiguity associated with direct phase measurement.

Model equations having the form of equation (1) may be used to calculate the total phase φ from intensity data 34 using the prior art Hilbert transform envelope-based interferometric technique and the Larkin envelope-based interferometric technique. FIG. 3B shows a plot 56 of the total phase φ calculated using intensity data 34, a model equation of the form of equation (1) and a Hilbert transform of intensity data 34. A problem with the above-discussed envelope-based interferometric techniques is that they yield only the total phase φ and not the phase offset θ. It is the phase offset θ that is related to the height (z dimension) of sample 12 at the location $(x, y)=(x_i, y_i)$ and not the total phase φ. In addition, because of the periodic nature of trigonometric functions and the uncertainty associated with which intensity data points 34 correspond to the $0^{th}$ order interference fringe, the above-discussed Hilbert transform and Larkin interferometric techniques exhibit an ambiguity of 2π in the total phase φ.

Another prior art interferometric technique to estimate the height (i.e. z dimension) of sample 12 is disclosed in U.S. Pat. No. 5,398,113 (de Groot) and is based on Fourier analysis of intensity data 34. Such Fourier-based interferometry techniques involve performing a fast Fourier transform (FFT) on intensity data 34 to transform intensity data 34 to the spatial frequency domain and finding the height profile of sample 12 by finding the slope of phase of the FFT with respect to the wavenumber k at $k=k_0$, where $k_0$ is the central wavenumber of light source 14. The profile generated by the slope of Fourier transform phase with respect to wavenumber has similar or slightly better resolution than those of envelope methods. In order to achieve the finer resolution according to de Groot (Journal of Modern Optics, 1995, vol 42, 389-401), the phase θ in Eq. (7) that is the Fourier transform phase at the central wave number $k_0$ is selected, and the profile found previously by the slope is used for removing the 2π ambiguity in the phase θ. Although the de Groot Fourier transform-based interferometric technique (i.e. profile of phase slope) may achieve better resolution than the envelope-based techniques, the de Groot Fourier-based interferometry technique requires considerably more time and/or computational resources to perform the relatively large number of calculations associated with performing the requisite FFT Fourier transforms.

Another drawback with these Fourier-based interferometric techniques to find the phase θ at the central wavenumber $k_0$, is that they necessarily involve approximations. More particularly, it is not possible to perform true Fourier transforms on intensity data 34, as true Fourier transforms require integration between $z=-\infty$ and $z=+\infty$. Since intensity data 34 is limited to a particular range of z values, the Fourier transforms of intensity data 34 represent approximations of the true Fourier transforms. Again without wishing to be bound by theory, the inventor is of the view that these necessary approximations limit Fourier-based interferometric techniques to z dimension resolutions on the order of greater than 1 nm.

Figure 3C:
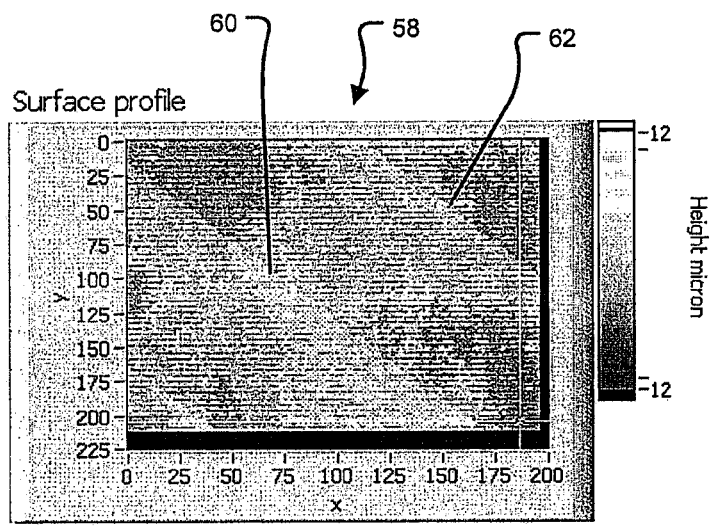
FIG. 3C is a schematic depiction of a surface profile which shows the fringe print-through artefacts obtained from prior art Fourier-based profile estimates.

Another drawback with z dimension profiles predicted using Fourier techniques is such z dimension profiles may exhibit so called fringe print-through. Fringe print-through artefacts show the structure of interference fringes in the resulting z dimension profile. An example z dimension profile 58 showing fringe print-through is shown in FIG. 3C. Profile 58 was obtained according to a Fourier-based technique over a z dimension scanning distance of 4 μm. It can be seen in FIG. 3C that profile 58 shows fringe print-through artefacts at 60 and 62. Again, without wishing to be bound by theory, the inventor suspects that fringe print-through artefacts are caused by the finite z dimension range of intensity data 34.

Figure 4:
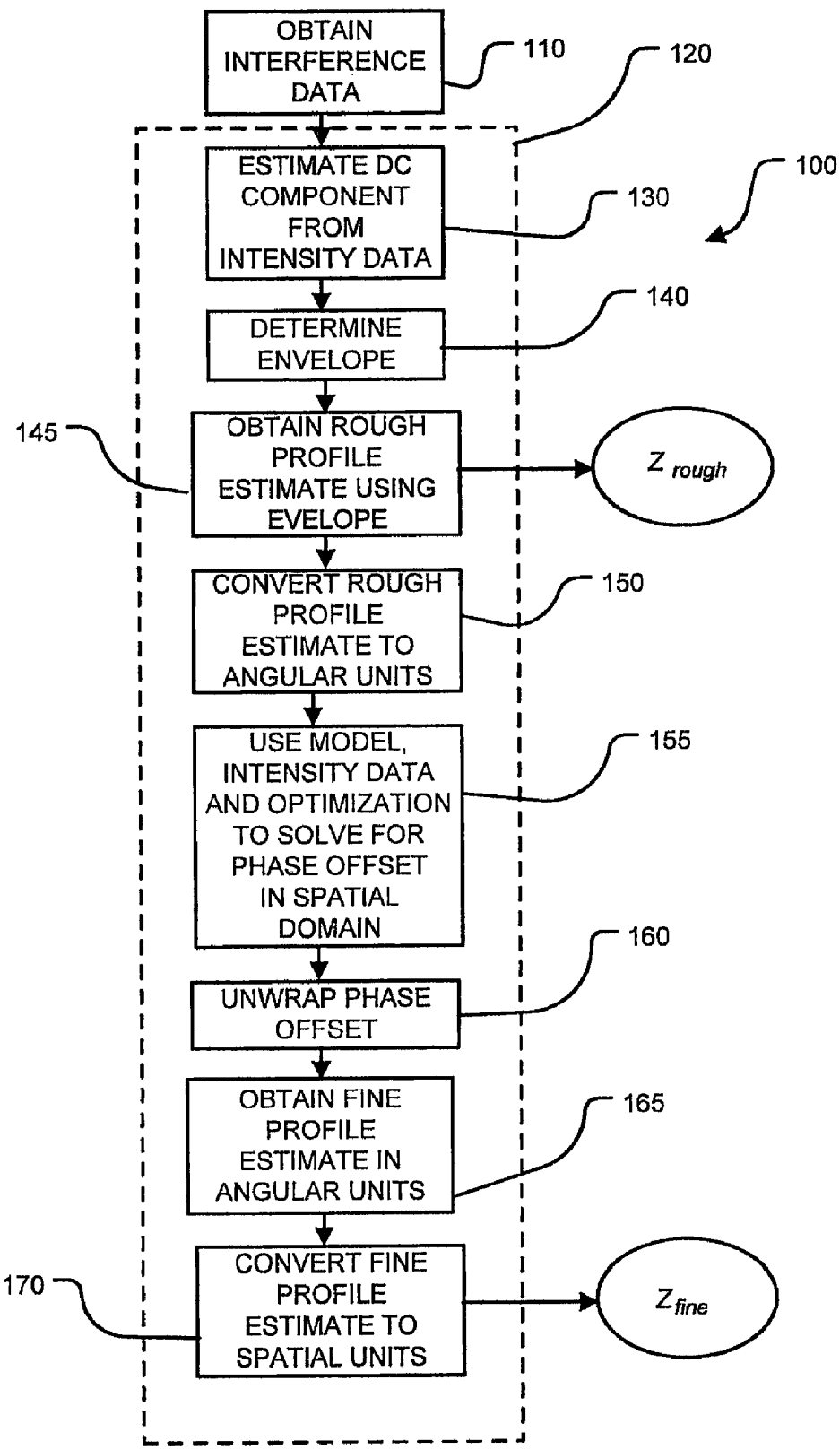
FIG. 4 schematically depicts a method for interferometrically characterizing a surface of a sample according to a particular embodiment of the invention.

FIG. 4 schematically depicts a method 100 for characterizing a sample 12 by interferometric profiling according to a particular embodiment of the invention. Method 100 commences in block 110 which involves obtaining interference data for a plurality of locations (x, y) on sample 12. For each (x, y) location on sample 12, the block 110 interference data may comprise intensity data 34 similar to that of FIG. 2B. Intensity data 34 may be obtained using interferometer 10 as described above by scanning sample 12 and/or reference surface 26 in the z-direction and causing sensor 32 to sample the light intensity at a plurality of different frames. The block 110 interference data may be stored in memory (not explicitly shown) that is part of, or otherwise accessible to, processor 36.

After obtaining interference data 34 in block 110, method 100 proceeds to block 120 (shown in dashed lines in FIG. 4), which involves extracting a z dimension estimate for each (x, y) location on sample 12. In the schematic illustration of FIG. 4, the block 120 procedures are only shown once. However, it will be understood that the block 120 procedures may be carried out for each location (x, y) of interest on sample 12. The block 120 procedures may be performed sequentially for each location (x, y), in parallel for each location (x, y) or partially serially and partially in parallel for each location (x, y). In the description that follows, the block 120 procedures are described for a particular location (x, y)=($x_i$, $y_i$) without loss of generality.

Method 100 proceeds to block 130, which involves using the block 110 intensity data 34 to estimate the DC component of intensity data 34 at the location (x, y)=($x_i$, $y_i$). As discussed above, intensity data 34 corresponding to the location (x, y)=($x_i$, $y_i$) may be modeled by equation (1):

$$I_m(x_i,y_i)=I_{bg}\{1+V(x_i,y_i)G_m(x_i,y_i)\cos[2\pi k_0(2m\Delta z)+\theta(x,y)]\} \quad (1)$$

Estimating the DC component in block 130 may involve obtaining an estimate for the DC term $I_{bg}$ in the equation (1) model based on the block 110 intensity data 34. In accordance with one particular embodiment, an estimate for the DC term $I_{bg}$ is obtained by averaging a number of intensity data values at the beginning and end of intensity data 34. For example, if intensity data 34 comprises N frames, then the estimated DC term $I_{bg}$ may be computed according to:

$$I_{bg} = \frac{\sum_{i=1}^{\alpha} I_{meas,m} + \sum_{m=N-\beta+1}^{M} I_{meas,m}}{\alpha + \beta} \quad (8)$$

where $\alpha$ and $\beta$ are integers which are preferably small in relation to the number of frames N. The number of intensity values (i.e. $\alpha$ and $\beta$) may be determined experimentally and may be based on the coherence length of light source 14. For example, if the coherence length of light source 14 is ~3 microns, then $\alpha$ and $\beta$ may be selected to such that intensity data 34 used to estimate the DC component $I_{bg}$ comes from a region more than 3 microns away from the sample location.

Method 100 then proceeds to block 140 which involves determining an envelope $M_m(x_i,y_i)$ for intensity data 34. Generally speaking, the block 140 envelope $M_m(x_i,y_i)$ may be determined from intensity data 34 using any suitable technique, including any of the aforementioned prior art techniques. In a currently preferred embodiment, block 140 makes use of the Larkin envelope determination technique described above in equation (2), where the measured intensity values 34 for the $(m-2)^{th}$, $(m-1)^{th}$, $m^{th}$, $(m+1)^{th}$ and $(m+2)^{th}$ frames are used in place of the terms $I_{m-2}$, $I_{m-1}$, $I_m$, $I_{m+1}$, $I_{+2}$. In general, we may use the notation $I_{meas,m}$ to represent the measured intensity value 34 of the $m^{th}$ frame. As discussed above, the Larkin envelope determination technique involves the assumptions that $G_n(x_i, y_i)$ is relatively close to $G_m(x_i, y_i)$ when n is relatively close to m and that there is a known relationship between the frame interval $\Delta z$ and the central wavenumber $k_0$ of light source 14.

After extracting the envelope $M_m(x_i,y_i)$ in block 140, method 100 proceeds to block 145 which involves using the envelope $M_m(x_i,y_i)$ to determine a rough estimate of the z dimension (i.e. the height) of sample 12 at the location (x, y)=($x_i$, $y_i$). The block 145 rough profile estimate may be obtained by finding the maximum of the envelope $M_m(x_i,y_i)$ to obtain $z_{max}$, by performing the centroid calculation of equation (4) to obtain $z_{cent}$ or by any other suitable technique. The centroid calculation is currently preferred over maximization. In accordance with the centroid technique, the centroid $z_{cent}$ calculated from the envelope $M_m(x_i,y_i)$ becomes the block 145 rough estimate of the z dimension $z_{rough}$.

Method 100 then proceeds to block 150, where the block 145 rough estimate of the z dimension $z_{rough}$ is converted into angular units by multiplying $z_{rough}$ by $$2\left(\frac{2\pi}{\lambda_0}\right),$$

where $\lambda_0$ is the central wavelength of light source 14 and the extra factor of 2 comes from the reflection of sample light 20F and reference light 20E. We may denote the angular units rough estimate as $\phi_{rough}$, where $$\phi_{rough} = 2z_{rough}\frac{2\pi}{\lambda_0}.$$

Method 100 then proceeds to block 155. Block 155 involves using the equation (1) model, the block 130 DC component $I_{bg}$ and the measured intensity data 34 ($I_{meas,m}$) to estimate the phase offset $\theta$. The block 155 phase offset estimation is preferably based on a curve fitting optimization technique that is performed in the spatial domain (i.e. without requiring a Fourier transform to the frequency domain or similar transforms). In one particular embodiment, the block 155 curve fitting optimization technique comprises a least squares technique, although a variety of other curve fitting optimization techniques could be used in block 155.

A particular embodiment of block 155 involving least squares curve fitting is now described. We define the term $I_{meas,m}$ to refer to the measured intensity data 34 corresponding to the $m^{th}$ frame. First, block 130 DC component $I_{bg}$ is subtracted from the measured intensity data 34 ($I_{meas,m}$) to yield a series of values $I^*_{meas,m}$, where $I^*_{meas,m}$ refers to the measured intensity data 34 ($I_{meas,m}$) without DC. Referring the equation (1) model, this DC offset yields a revised model:

$$I^*_m(x_i,y_i)=I_{bg}V(x_i,y_i)G_m(x_i,y_i)\cos[2\pi k_0(2m\Delta z)+\theta(x,y)]\} \quad (9)$$

where we use $I^*_m$ to denote the model value for the $m^{th}$ frame without DC. As will be explained in more detail below, the block 155 curved fitting optimization may minimize a cost function which depends on the difference between the model values $I^*_m$ (without DC) and the measured values $I^*_{meas,m}$ (without DC) for all available frames by fitting frame independent parameters. For each frame m, the cost function may be weighted by the corresponding value of the envelope $M_m$ at the $m^{th}$ frame. The effect of removing the DC component $I_{bg}$ prior to performing the block 155 curve fitting optimization is to reduce the number of variables in the optimization process by one. This reduction in variables reduces the processing resources consumed in the curve fitting optimization process.

Equation (9) may be rewritten as:

$$I^*_m=I_{bg}V(x_i,y_i)G_m(x_i,y_i)\{\cos[2\pi k_0(2m\Delta z)]\cos(\theta(x_i,y_i))-\sin[2\pi k_0(2m\Delta z)]\sin(\theta(x_i,y_i))\} \quad (10)$$

where the cosine term of equation (9) has been expanded using trigonometric identities. We now define the following variables: $\alpha_1=\cos(\theta(x_i,y_i))$ and $\alpha_2=\sin(\theta(x_i,y_i))$ which are independent of the frame number m and $\beta_m=2\pi k_0(2m\Delta z)$ which depends on the frame number m. Rewriting equation (10) in terms of these new variables yields:

$$I^*_m=M_m(x_i,y_i)\{\alpha_1\cos\beta_m-\alpha_2\sin\beta_m\} \quad (11)$$

Equation (11) may be used to create a least squares cost function, which compares the model values $I^*_m$ (without DC) to the measured values $I^*_{meas,m}$ (without DC):

$$E = \sum_{m=1}^{N} \{I^*_{meas,m} - [M_m a_1 \cos(\beta_m) - M_m a_2 \sin(\beta_m)]\}^2 \qquad (12)$$

While equation (12) represents a least squares cost function, the invention may make use of other forms of cost function. A suitable optimization technique may then be applied to minimize the cost function (12). Non-limiting examples of such techniques include least square optimization, Newton's method, the Gradient descent method or the like. In one particular embodiment, the cost function (12) is minimized by a least squares technique when $$\frac{\partial E}{\partial a_1} = 0$$

and $$\frac{\partial E}{\partial a_2} = 0$$

which, when applied to equation (12) respectively yield:

$$\sum_m I^*_{meas,m} M_m \cos\beta_m = a_1 \sum_m M_m^2 \cos^2\beta_m - a_2 \sum_m M_m^2 \sin\beta_m \cos\beta_m \qquad (13a)$$

and $$\sum_m I^*_{meas,m} M_m \sin\beta_m = a_1 \sum_m M_m^2 \cos\beta_m \sin\beta_m - a_2 \sum_m M_m^2 \sin^2\beta_m \qquad (13b)$$

Equations (13a) and (13b) may be solved for $a_1$ and $a_2$ and then the phase offset $\theta(x_i, y_i)$ may then be obtained according to:

$$\theta(x_i, y_i) = \tan^{-1}\left(\frac{a_1}{a_2}\right) \qquad (14)$$

It may be seen from the left hand side of equations (13a) and (13b) that, for each frame m, the measured quantity $I^*_{meas,m}$ (after removal of the DC component) is multiplied by the corresponding value of the envelope $M_m$ for the $m^{th}$ frame. This multiplication provides a weighting to the optimization wherein data points (frames) near the envelope peak are given more importance than outlying data points. This weighting represents an advantage of the current invention over prior art surface profiling techniques, because the data further away from the envelope peak have less contrast and less signal to noise ratio. Therefore the effects of noise further away from the envelope peak are reduced accordingly. Other optimization techniques may also employ a weighting technique wherein, for each frame m, measured data is weighted by the corresponding value of the envelope $M_m$ for the $m^{th}$ frame.

Once the phase offset $\theta(x_i, y_i)$ is determined in block 155, method 100 proceeds to block 160 which involves "unwrapping" the block 155 phase offset $\theta(x_i, y_i)$ to remove the $2\pi$ phase ambiguity. Block 160 may involve finding the integral number p of $2\pi$ periods that fit into the height profile estimate and/or the remainder quantity v. In one particular embodiment, the block 160 unwrapping involves finding the integer p and/or the remainder quantity v in the equation:

$$\phi_{rough} - \theta(x_i, y_i) = p 2\pi + v \qquad (15)$$

where $\phi_{rough}$ is the block 150 angular units rough estimate, $\theta(x_i, y_i)$ is the block 155 phase offset, p is an integer and v is a quantity in a range $0 \leq v < 2\pi$. The respective quantities p and v are effectively the integral quotient and the remainder of $$\frac{\phi_{rough} - \theta}{2\pi}.$$

The remainder quantity v may be referred to in terms of the modulo operator—i.e. $v = (\phi_{rough} - \theta)$ modulo $2\pi$.

Method 100 then proceeds to block 165 which involves using the block 160 integer p and/or the block 165 remainder v to find a fine profile estimate in angular units. We denote the fine profile estimate in angular units by $\phi_{fine}$. The fine profile estimate $\phi_{fine}$ may be found according to:

$$\phi_{fine} = p 2\pi + \theta(x_i, y_i) \qquad (16a)$$

or, equivalently, according to:

$$\theta_{fine} = \phi_{rough} - v \qquad (16b)$$

The block 165 angular units fine profile estimate $\phi_{fine}$ is then converted back to spatial units in block 170 to obtain the spatial units fine profile estimate $z_{fine}$ according to:

$$z_{fine} = \frac{1}{2} \phi_{fine} \left(\frac{\lambda_0}{2\pi}\right) \qquad (17)$$

The block 170 spatial units fine profile estimate $z_{fine}$ represents the output of method 100 for the z profile dimension at the location $(x, y) = (x_i, y_i)$.

Figure 5A:
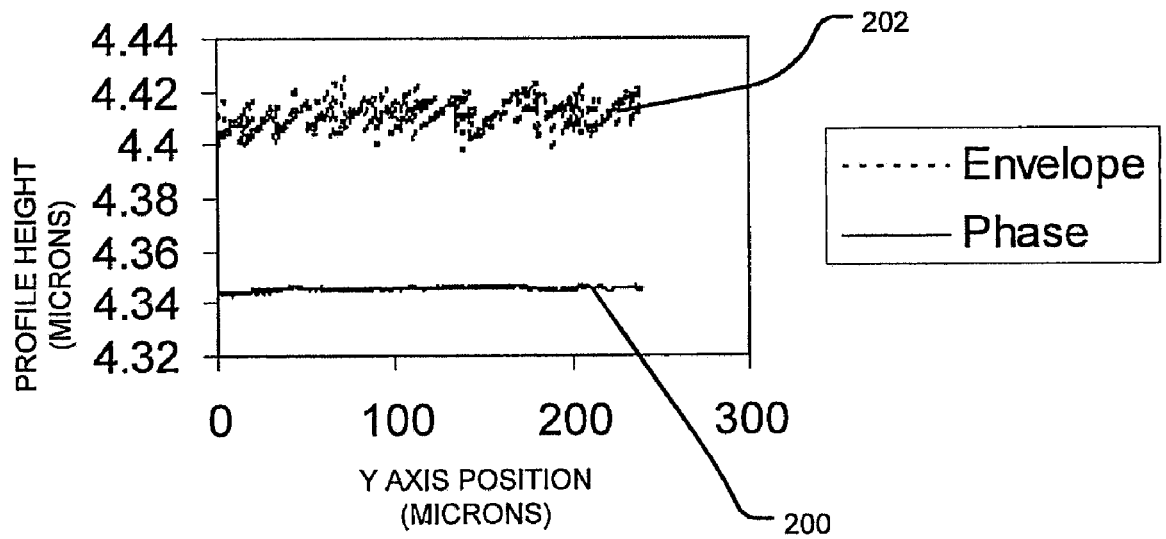
FIG. 5A is a plot which depicts the improved resolution of the FIG. 4 interferometric characterization method over prior art techniques based on envelope information alone.

FIG. 5A shows a plot 200 of typical experimental results of z dimension estimates ($z_{fine}$) which are performed according to method 100 so as incorporate the phase offset $\theta(x_i, y_i)$ into the z dimension estimates. The FIG. 5A plot 200 represents the height estimates $z_{fine}$ for a sample 12 having a high quality (i.e. smooth) optical surface 52 (see FIG. 2A) for various y positions along surface 52. For comparison purposes, FIG. 5A also shows a plot 202 of the height estimates $z_{rough}$ obtained using a centroid-based technique using envelope information only—i.e. without incorporating the phase offset $\theta(x_i, y_i)$. Comparing plots 200 and 202, it can be seen that the method 100 estimation technique results in superior resolution by eliminating the noise associated with the envelope-based techniques. In experiments performed to date, the inventor has obtained resolutions on the order of 0.95 nm using method 100. These resolutions represent a significant improvement over the envelope-based techniques which are limited to about 3-5 nm.

Figure 5B:
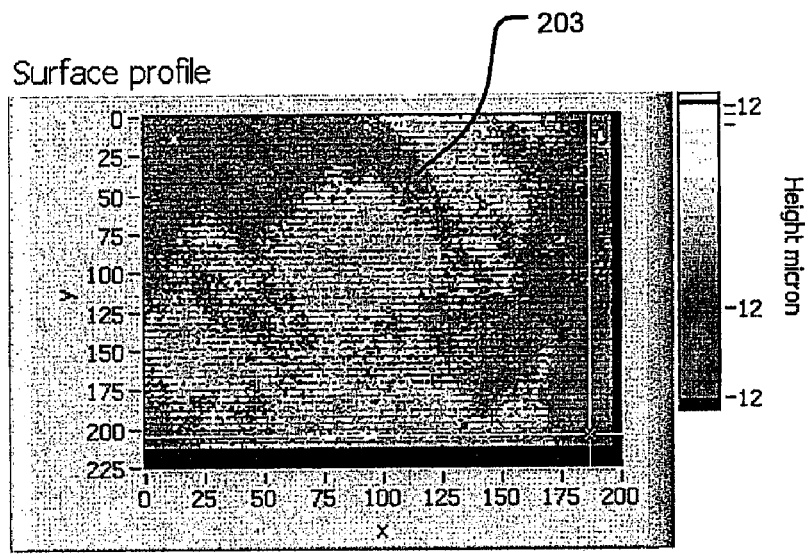
FIG. 5B is a schematic depiction of a surface profile which depicts the lack of fringe print-through artefacts in obtaining a profile estimate using the FIG. 4 interferometric characterization method.

The RMS resolutions of the z dimension estimates obtained using method 100 represent a 5%-10% improvement over z dimension estimates obtained according to prior art Fourier transform techniques. While this improvement in RMS resolution over Fourier transform techniques may be relatively small, method 100 does show that significant resolution improvements can be obtained for shorter z-dimension scans. For example, as shown in FIG. 3C, a z dimension scan of 4 μm using a Fourier technique exhibits fringe print-through artefacts 60, 62. FIG. 5B depicts an example z dimension profile 203 obtained according to method 100 using the same raw intensity data 34 used to obtain the Fourier-based profile 58 (FIG. 3C)—i.e. a 4 μm scan in the z dimension. Comparing FIGS. 3C and 5B, it can be seen that the profiles are similar but that method 100 largely eliminates the fringe print-through artefacts associated with the Fourier-based profile. The elimination of fringe print-through artefacts will become more important for the film characterization methods discussed in more detail below, because usable z dimension data is further reduced by the multi-fringe properties of a substrate coated by a film.

Another advantage of method 100 over prior art envelope-based and Fourier-based techniques (for example) is that method 100 does not require a predetermined sampling interval in order to achieve good results. For example, the prior art envelope-based estimation technique based on the Larkin equation (2) requires that the sampling interval (frame interval) be close to $\lambda_0/8$ (where $\lambda_0$ is the central wavelength). If the sampling interval is $\lambda_0/6$, then the resolution achieved using the Larkin envelope will be degraded approximately by a factor of 1.8. However, using method 100, if we adopt lower frame interval of $\lambda_0/6$ to obtain the block 145 rough profile $z_{rough}$, we will obtain worse resolution in the rough estimate $z_{rough}$. However, method 100 will still be able to achieve the same block 170 fine resolution $z_{fine}$ as that of a $\lambda_0/8$ sampling interval. This achievement occurs because the procedure of method 100 only needs the rough estimate $z_{rough}$ for removing the $2\pi$ phase ambiguity. The accuracy and resolution of method 100 fine estimate $z_{fine}$ is unaffected by the rough estimation $z_{rough}$, unless the errors in $z_{rough}$ exceed $2\pi$ radians (when $z_{rough}$ is expressed in angular units $\phi_{rough}$). This advantage of method 100 means that method 100 can operate with less sampled data and will therefore consume a reduced amount of processing resources.

Figure 6A:
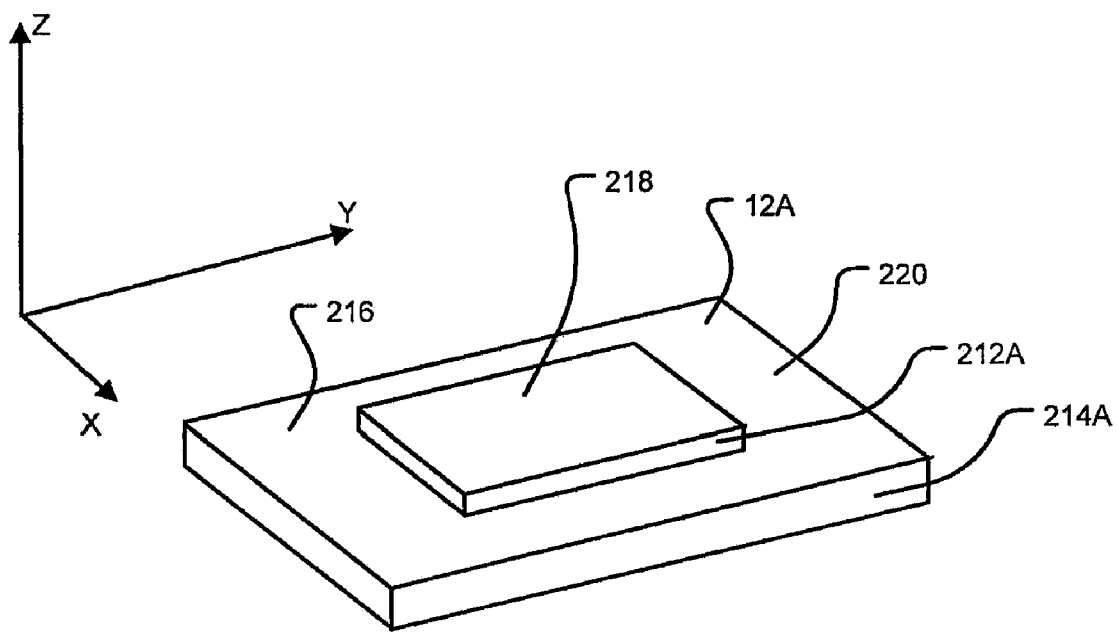
FIGS. 6A and 6B respectively schematically depict film samples to which the invention may be applied wherein a surface of the substrate is available in the sample of FIG. 6A and the substrate is completely covered by the film in the sample of FIG. 6B.
Figure 6B:
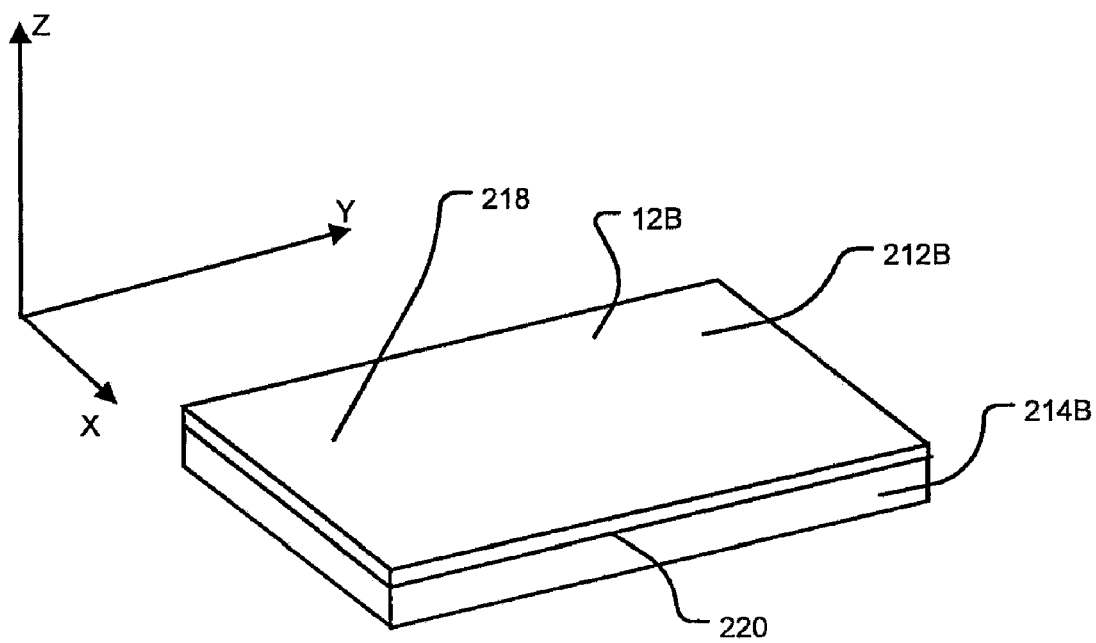

Another aspect of the invention provides methods and systems for characterizing films deposited onto substrates by using such a substrate and its accompanying film as sample 12 in interferometer 10. FIGS. 6A and 6B schematically depict two scenarios for film characterization. FIGS. 6A and 6B both depict films 212A, 212B (together, film 212) layered atop substrates 214A, 214B (together, substrates 214). By way of non-limiting example, films 212 may comprise dielectric films, such as silicon oxide or zinc oxide or the like. The principal difference between sample 12A of FIG. 6A and sample 12B of FIG. 6B is that a portion 216 of the surface 220 of substrate 214A is exposed in sample 12A, whereas in sample 12B, film 212B covers the entire surface 220 of substrate 214B.

Figure 7C:
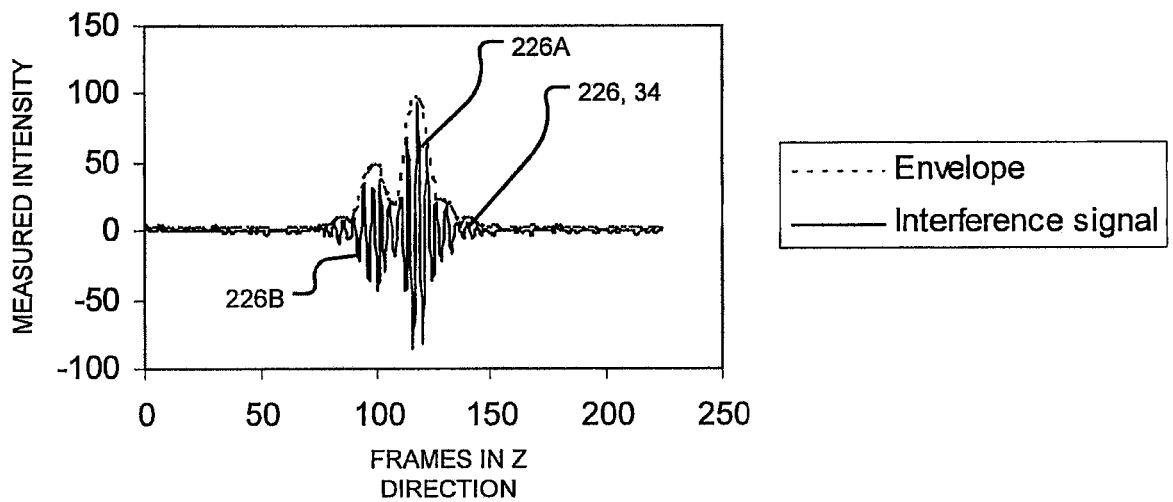
FIGS. 7B and 7C are plots of intensity data obtained from samples which incorporate films on substrates.
Figure 7A:
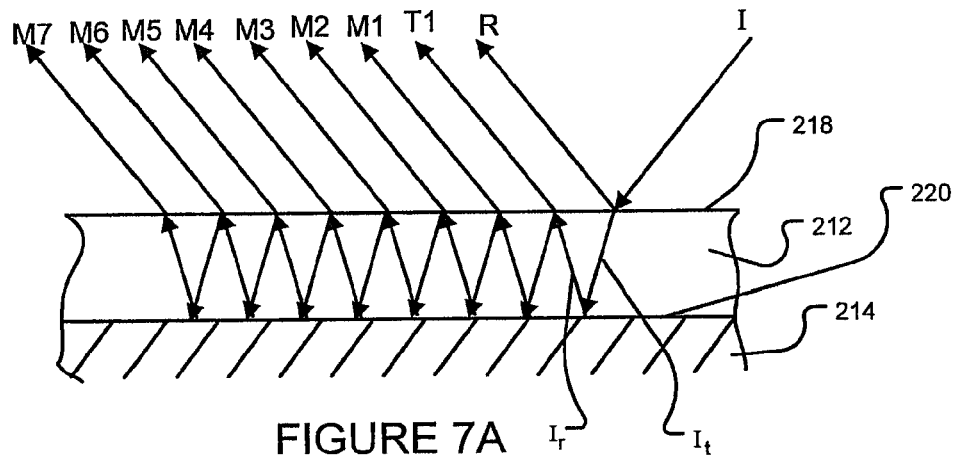
FIG. 7A schematically depict the rays reflected from a sample which incorporates a film on a substrate.

FIG. 7A shows the pattern of incident light I reflected from a film 212 on a substrate 214. A first portion of incident light I is reflected from surface 218 of film 212 to become light R. A portion of the incident light I is transmitted through surface 218 of film 212 as light $I_t$. A portion of the transmitted light $I_t$ is reflected from the interface 220 of film 212 and substrate 214 as light $I_r$. A portion of light $I_r$ is transmitted through interface 218 as light T1. It will be appreciated that this pattern of reflection and/or transmission from interfaces 218, 220 will continue to generate light M1, M2, M3 . . . as shown in FIG. 7A.

The amplitudes of the complex components R, T and M1 may be given by the following equations:

$$R = r_{01}$$

$$T = (1 - r_{01}^2) r_{12} \alpha_t^2$$

$$M_1 = (1 - r_{01}^2) r_{12}^2 r_{10} \alpha_t^4 \quad (18)$$

where: r is the complex coefficient of reflection; t is the complex coefficient of transmission; the subscripts 0, 1, 2 respectively represent air, film and substrate (e.g. $t_{01}$ represents the transmittance at the air-film interface 218 (FIG. 7A) and $r_{12}$ represents the reflectance at the film-substrate interface 220 (FIG. 7B)); and $\alpha_t$ represents the transmission factor. For a non-absorptive film 212, the transmission factor $\alpha_t$ may be given by $\alpha_t = \exp(j2\pi n k d)$ where n is the refractive index of film 212 at the wavenumber k, d is the thickness of film 212 and $j = \sqrt{-1}$.

It will be appreciated that expressions similar to those of equation (18) may be generated for the different reflective components M2, M3 . . . . However, the more often light is internally reflected within film 212, the lower the intensity of the resultant light T, $M_1$, $M_2$, $M_3$ . . . . By way of example, for the case of a silicon oxide film 212 (n≈1.46) on a silicon substrate 214 (n≈4.1), |R|≈0.187, |T|≈0.45, |$M_1$|≈0.037 and $M_2$, $M_3$, $M_4$ . . . <<0.037. Because of this decreasing amplitude for the different reflections, the model described in more detail below only makes use of the two components R and T. It will be appreciated by those skilled in the art, that models could be generated to incorporate the contributions from additional components $M_1$, $M_2$, $M_3$ . . .

Figure 7B:
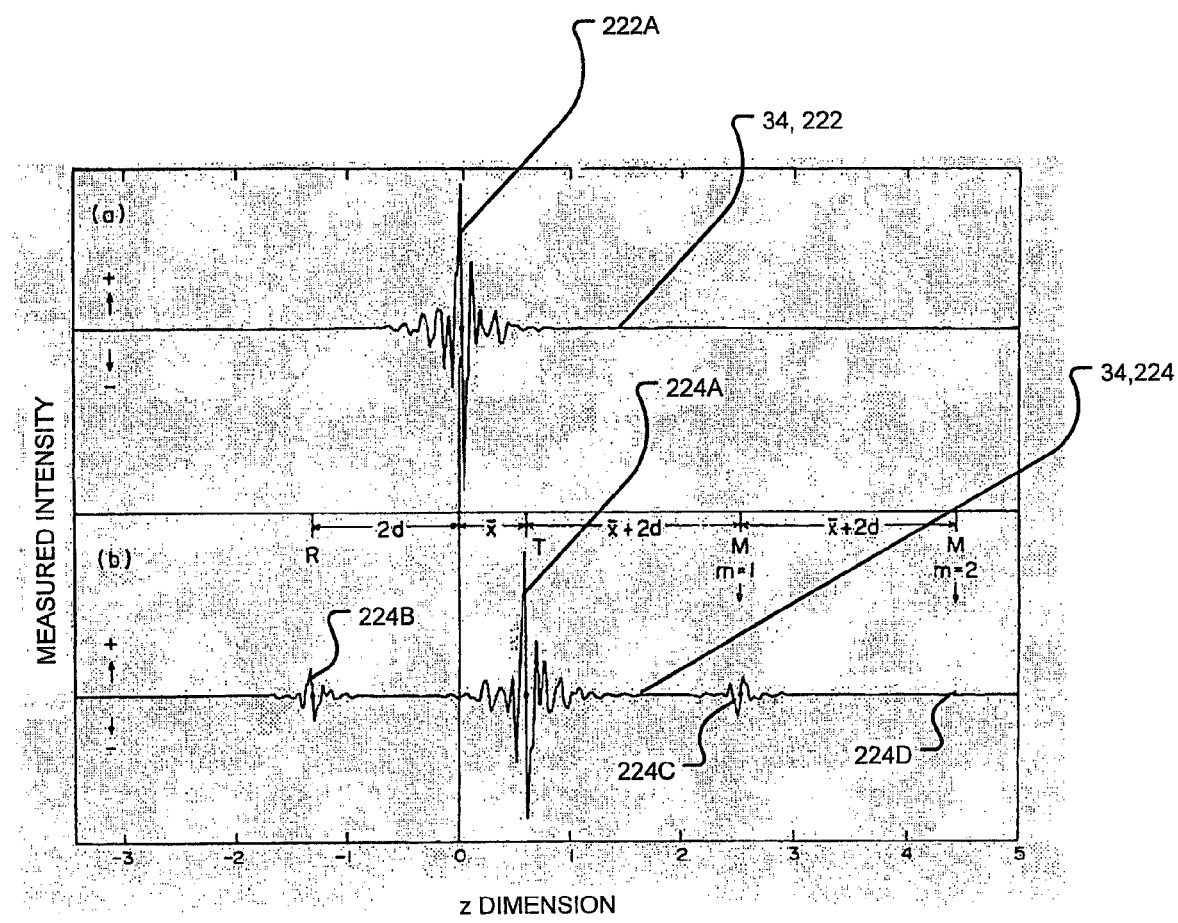

FIG. 7B shows the effect of the reflection from film 212 on intensity data 34 when a sample 12 incorporating a film 212 is used in interferometer 10. Upper plot 222 of FIG. 7B shows intensity data 34 for a sample 12 having a bare substrate 214 (e.g. portion 216 of substrate 214A of sample 12A (FIG. 6A)). It can be observed that plot 222 exhibits a single interference waveform 222A. In contrast, lower plot 224 of FIG. 7B shows intensity data 34 for a sample 12 having a substrate 214 coated with a film 212. Plot 224 shows that for the sample having film 212, there are multiple interference waveforms 224A, 224B, 224C and 224D. In the particular case of plot 224, interference pattern 224A corresponds to light T of FIG. 7A, interference pattern 224B corresponds to light R of FIG. 7A, interference pattern 224C corresponds to light M1 of FIG. 7A and interference pattern 224D corresponds to light M2 of FIG. 7A.

As film 212 becomes increasingly thin, the separation between the interference patterns 224A, 224B, 224C becomes less pronounced. This is shown, for example, in FIG. 7C which shows a plot 226 of intensity data 34 for a sample having a film 212 on a substrate 214. In the FIG. 7C plot, portions of the interference patterns 226A, 226B overlap with one another in the z dimension.

Particular embodiments of the invention provide systems and methods for characterizing films 212 deposited on substrates 214. Characterizing a film 212 may involve estimating: the thickness of film 212; and, in some cases, the surface profile(s) of one or more surfaces including, for example, surface 218 of film 212 and/or surface 220 at the interface between film 212 and substrate 214 (see FIGS. 6A, 6B). This film characterization may be implemented by interferometer 10 using a sample 12 which incorporates a film 212 on a substrate 214.

Particular embodiments of the invention make use of models to describe the R and T components of the light received at sensor 32 (i.e. the R and T components of intensity data 34). The R component is essentially the same as reflection from a single surface and may be modeled by the model of equation (1) as discussed above. While equation (18) is useful to describe the T component, it does not account for dispersion where the index of refraction in film 212 is wavelength dependent. Taking dispersion into account, the T component of intensity data 34 may be modeled by:

$$I(z) = I_0 \left\{ 1 + (1+\eta^2)^{-1/4} \exp\left[-\frac{1}{1+\eta^2}\left(\frac{z-s}{l_c}\right)^2\right] \times \cos\left[\frac{\eta}{1+\eta^2}\left(\frac{z-s}{l_c}\right)^2 + 2k_0(z-s) + \Phi_0 + \Delta\varphi\right] \right\} \quad (19)$$

where:

$I_0$ represents a DC component;

$\eta = 8\alpha d(\Delta k)^2$ is a dispersion parameter related to: $\alpha$ which represents the rate of change of refractive index n with wavenumber (i.e. $\alpha = dn/dk$); d which represents the thickness of film 212; and $\Delta k$ which represents the bandwidth of light source 14 in the spatial frequency domain;

$l_c = (2\Delta k)^{-1}$;

$s = d[n(k_0) + \alpha k_0 - 1]$ and $k_0$ is the central wavenumber;

$\Phi_0 = 2\alpha d k_0 - \frac{1}{2} \tan^{-1}(\eta)$ and $\Delta\phi$ are extra phase parameters associated with dispersion in film 212.

It may be observed that the equation (19) model of the T component is similar to the equation (1) model of the R component in that the equation (19) model incorporates a DC term and an envelope term multiplied by a cosine term. Accordingly, we may recast equation (19) to have a form that is even more similar to that of equation (1) and we may model the superposition of the R and T components as follows:

$$I_m(x_i,y_i) = I_{bg}\{1 + \{V_1(x_i,y_i)G_m(z-z_1)\cos[2\pi k_0(2m\Delta z) + \theta_1(x_i,y_i)] + V_2(x_i,y_i)G_m(z-z_2)\cos[2\pi k_0(2m\Delta z) + \theta_2(x_i,y_i)]\}\} \quad (20)$$

where:

$G_m$ represents the contribution to the envelope at the $m^{th}$ frame from a single component and $z_1$ and $z_2$ respectively represent the center of the envelope of the R component alone and the center of the envelope of the T component alone;

$V_1(x_i,y_i)$ and $V_2(x_i,y_i)$ respective fringe visibility terms (usually constant) of the R and T components and are dependent on the indices of refraction of the film 212 and substrate 214;

$\theta_1(x_i,y_i)$ represents the phase offset component corresponding to surface 218 of film 212; and $\theta_2(x_i,y_i)$ represents the phase offset component corresponding to interface 220 between film 212 and substrate 214.

Figure 8:
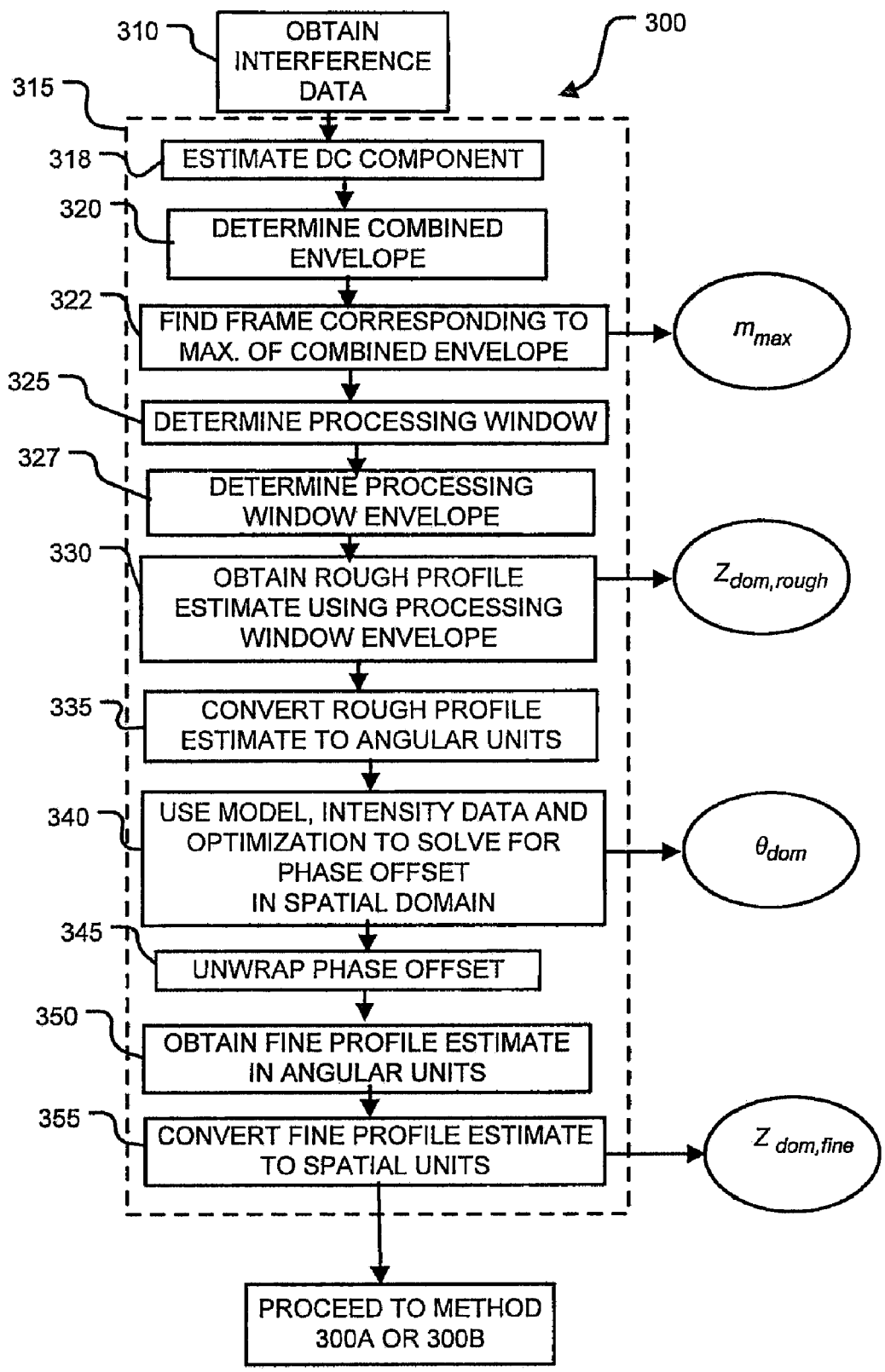
FIG. 8 schematically depicts a portion of a method for interferometrically characterizing a sample incorporating a film on a substrate according to a particular embodiment of the invention.
Figure 9A:
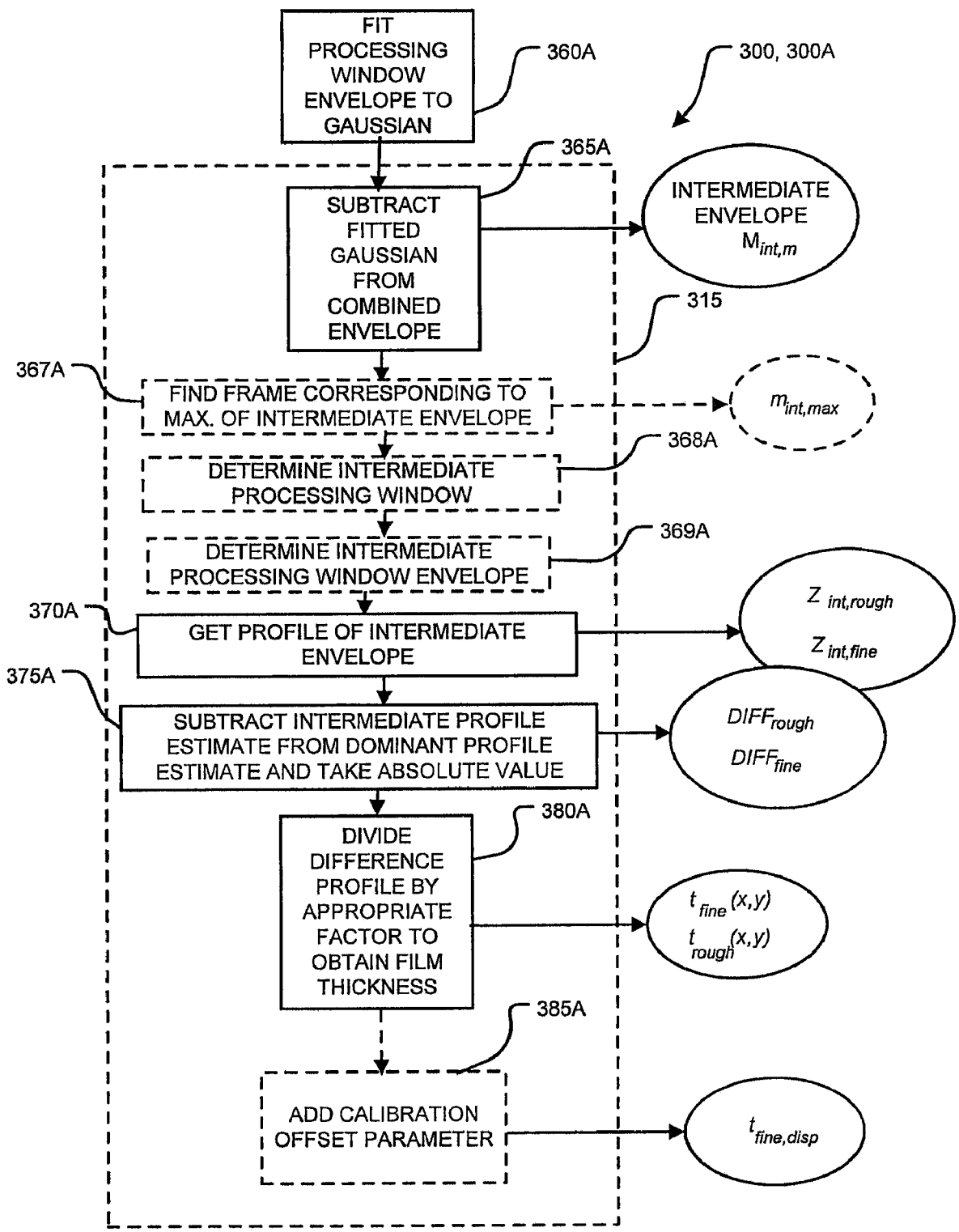
FIGS. 9A and 9B schematically depict alternative portions of a method for interferometrically characterizing a sample incorporating a film on a substrate according to particular embodiments of the invention.
Figure 9B:
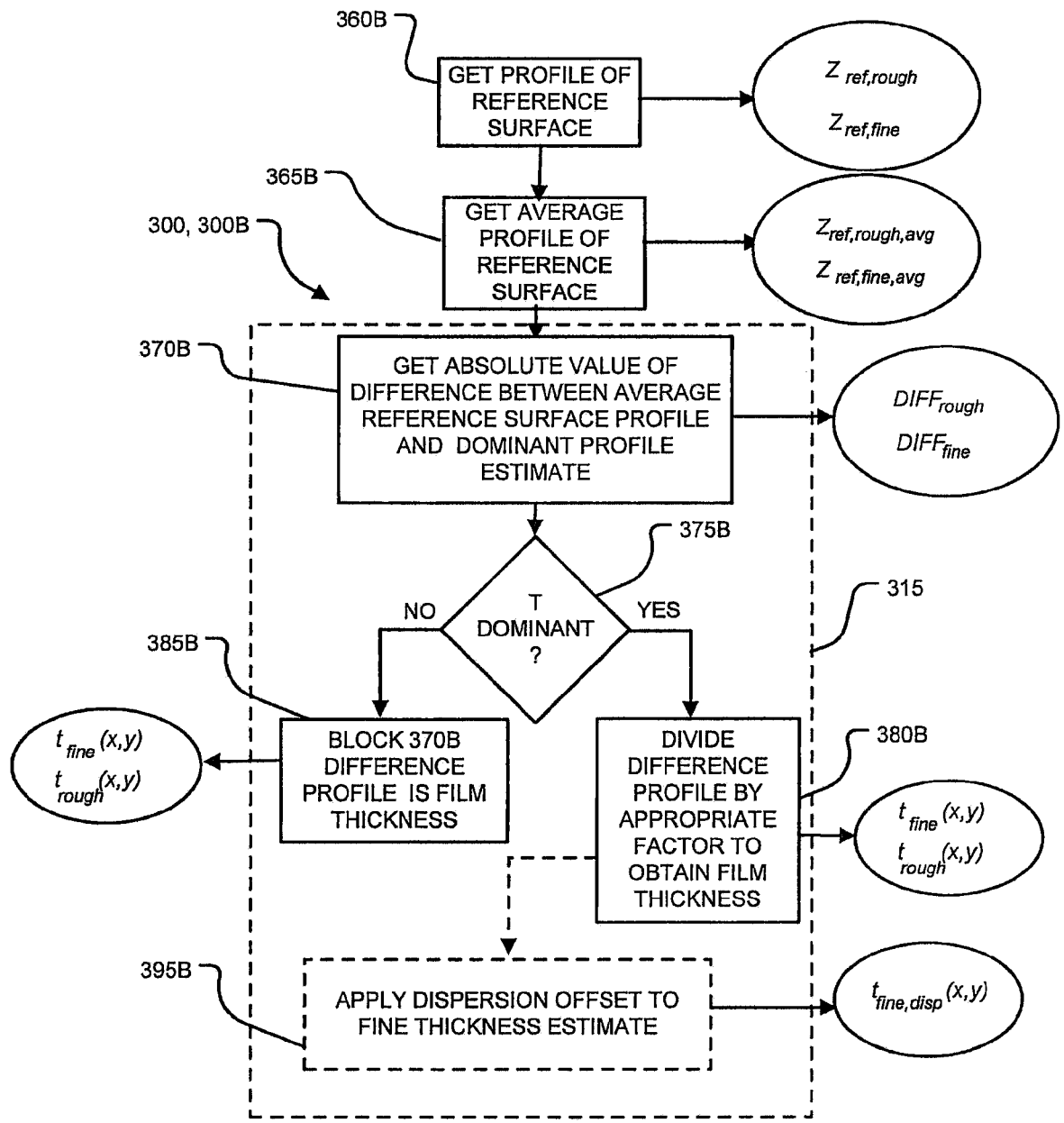

FIGS. 8, 9A and 9B schematically depict a method 300 according to a particular embodiment of the invention for characterizing a film 212 deposited on a substrate 214 according to particular embodiments of the invention. In the illustrated embodiment, characterizing a film 212 involves estimating: the thickness t(x,y) of film 212 in the z dimension for various (x,y) locations; and, where desired, the z dimension surface profile at various (x,y) locations of surface 218 of film 212 and/or surface 220 at the interface between substrate 214 and film 212 (see FIGS. 6A, 6B). Method 300 may be implemented by interferometer 10 using a sample 12 which incorporates a film 212 on a substrate 214.

Method 300 commences in block 310 which involves obtaining interference data. Block 310 may be performed by relative scanning between sample 12 and reference surface 26. Obtaining interference data in block 310 may be performed in a manner substantially similar to that of block 110 discussed above. The block 310 interference data may comprise intensity data 34 for each (x, y) location of interest on sample 12. The block 310 interference data may comprise intensity data 34 having a shape similar to that of FIG. 7C, except that the block 310 intensity data 34 is discretized over a number of frames in the z direction. As discussed above, the block 310 intensity data 34 can be modeled according to equations: (1)—R component; (19)—T component; and (20)—superposition of R and T components.

Method 300 then proceeds to block 315 which involves obtaining characterization information for each (x, y) location on sample 12. In the schematic illustration of FIG. 8, the block 315 procedures are only shown once. However, it will be understood that the block 315 procedures may be carried out for each location (x, y) of interest on sample 12. The block 315 procedures may be performed sequentially for each location (x, y), in parallel for each location (x, y) or partially serially and partially in parallel for each location (x, y). In the description that follows, the block 315 procedures may be described for a particular location (x, y)=$(x_i, y_i)$ without loss of generality.

In block 318, method 300 uses the block 310 intensity data 34 to estimate a DC component $I_{bg}$. Block 318 may be substantially similar to block 130 described above and may involve averaging a number of intensity data values at the beginning and end of intensity data 34 (i.e. away from interference patterns 226A, 226B of plot 226 (see FIG. 7C)).

Method 300 then proceeds to block 320 which, in the illustrated embodiment, involves finding an envelope $M_{tot,m}(x_i,y_i)$ of the block 310 intensity data 34. We may refer to the block 320 envelope as a combined envelope $M_{tot,m}(x_i,y_i)$, since it combines interference information relating to the R component and the T component. Generally speaking, the block 320 combined envelope $M_{tot,m}(x_i,y_i)$ may be determined from intensity data 34 using any suitable technique including any of the aforementioned prior art techniques. In a currently preferred embodiment, block 320 makes use of the Larkin envelope determination technique described above in equation (2), where the measured intensity values 34 for the $(m-2)^{th}, (m-1)^{th}, m^{th}, (m+1)^{th}$ and $(m+2)^{th}$ frames are used in place of the terms $I_{m-2}, I_{m-1}, I_m, I_{m+1}, I_{m+2}$.

Method 300 then proceeds to block 322 which involves finding the frame $m_{max}$ corresponding to a maximum $M_{tot,max}(x_i,y_i)$ of the block 320 combined envelope $M_{tot,m}(x_i,y_i)$. The maximum $M_{tot,m}(x_i,y_i)$ may be located by comparing the combined envelope values for each frame m in the z direction, for example. In some embodiments, it is not necessary to locate the frame $m_{max}$ which corresponds exactly to the combined envelope maximum $M_{tot,max}(x_i,y_i)$, but it may be possible to get near the combined envelope maximum $M_{tot,max}(x_i,y_i)$. For example, in some embodiments, the block 322 frame may be selected to correspond to the centroid of the combined envelope $M_{tot,m}(x_i,y_i)$.

After locating the frame $m_{max}$ corresponding to the combined envelope maximum $M_{tot,max}(x_i,y_i)$, method 300 proceeds to block 325 which involves using the frame $m_{max}$ to determine a processing window. In some embodiments, the processing window is defined by the range $[m_{max}-\Delta_1, m_{max}+\Delta_2]$, where $\Delta_1, \Delta_2$ represent integral numbers of frames above and below the block 322 quantity $m_{max}$. In some embodiments, $\Delta_1 = \Delta_2 = \Delta$. In some embodiments, $\Delta_1$ and $\Delta_2$ are constants. In some embodiments, $\Delta_1$ and $\Delta_2$ are independent of film thickness and/or the sampling interval.

Advantageously, method 300 does not require a computationally expensive thresholding process to separate the dominant one of the R and T components from the non-dominant one of the R and T components. With method 300, the processing window $[m_{max}-\Delta_1, m_{max}+\Delta_2]$ may be relatively narrow in comparison to prior art techniques while achieving comparable (or better) results. In some embodiments, $\Delta_1 \leq 10$ and $\Delta_2 \leq 10$. In other embodiments, $\Delta_1 \leq 5$ and $\Delta_2 \leq 5$. In some embodiments, the width of the processing window [$m_{max}-\Delta_1$, $m_{max}+\Delta_2$] is less than twice the central wavelength $\lambda_0$ of light source 14 in the spatial domain. In some embodiments, the width of the processing window [$m_{max}-\Delta_1$, $m_{max}+\Delta_2$] is less than the central wavelength $\lambda_0$ of light source 14 in the spatial domain. This relatively narrow processing window of method 300 may be due to the incorporation of phase information $\theta_{dom}$ into the dominant profile estimation as explained in more detail below.

For method 300, the width of the processing window [$m_{max}-\Delta_1$, $m_{max}+\Delta_2$] may also be independent of the film thickness and/or the sampling interval. The width of the block 325 processing window [$m_{max}-\Delta_1$, $m_{max}+\Delta_2$] may, however, depend on the fringe contrast. The fringe contrast varies between 0 (for materials with highly different reflectivity from that of the interferometer reference surface 26) to 1 (for materials with identical reflectivity to that of the interferometer reference surface 26). In general, a larger processing window may be used for a smaller fringe contrast and a smaller processing window may be used for a larger fringe contrast. In some embodiments, the ratio of the number of samples in the block 325 processing window to the fringe contrast is in a range of 5-75. In some embodiments, this range may be 8-25.

The method 300 processing window [$m_{max}-\Delta_1$, $m_{max}+\Delta_2$] represents only about ½ to ⅔ of the sample points required for the most efficient prior art techniques, which involve thresholding the combined envelope in effort to separate the R and T components (see U.S. Pat. No. 7,119,909). Clearly, using such a small processing window reduces the consumption of processing resources when compared to prior art techniques. In addition, while reducing the consumption of processing resources, the use phase information $\theta_{dom}$ according to the present invention (explained in more detail below) also achieves superior resolution over the prior art techniques which do not use phase information. The prior art thresholding process of U.S. Pat. No. 7,119,909 also depends on the film thickness when separating the R and T components. That is, the height of the thresholded data will vary with the film thickness. In contrast, the processing window selected in block 325 of method 300 is independent of the film thickness.

Once the block 325 processing window [$m_{max}-\Delta_1$, $m_{max}+\Delta_2$] is determined, method 300 proceeds to block 327 to define a processing window envelope function $M^*_{tot,m}(x_i, y_i)$. The processing envelope function $M^*_{tot,m}(x_i, y_i)$ is given by:

$$M^*_{tot,m}(x_i, y_i) = \begin{cases} M_{tot,m}(x_i, y_i) & \text{for } m_{max}-\Delta_1 \leq m \leq m_{max}+\Delta_2 \\ 0 & \text{otherwise} \end{cases} \quad (22)$$

where $M_{tot,m}(x_i, y_i)$ is the block 320 combined envelope. Method 300 assumes that processing window envelope function $M^*_{tot,m}(x_i, y_i)$ represents the part of the envelope within the region where the interference contribution of the dominant one of the R and T components is separated from the interference contribution of the weaker one of the R and T components. Effectively, this reduces the superposition equation (20) of the R and T components to a single equation having the form of equation (1) for the dominant one of the R and T components.

Method 300 then proceeds to block 330 which involves using the processing window envelope function $M^*_{tot,m}(x_i, y_i)$ to obtain a rough z dimension estimate $z_{dom,rough}$ corresponding to the dominant (R or T) component. The block 330 rough estimate process may be similar to that of block 145 described above, except that the processing window envelope function $M^*_{tot,m}(x_i, y_i)$ may be used in place of the envelope $M_m(x_i, y_i)$. More particularly, the block 330 rough estimate process may involve determining the centroid of the processing window envelope function $M^*_{tot,m}(x_i, y_i)$ or finding a maximum the processing window envelope function $M^*_{tot,m}(x_i, y_i)$. The result of block 330 is a z dimension rough estimate $z_{dom,rough}$ corresponding to the dominant (R or T) component. The block 330 z dimension rough estimate $z_{dom,rough}$ may be used to help determine the thickness t of film 212, as discussed in more detail below.

In block 335, the block 330 rough estimate $z_{dom,rough}$ is converted into angular units to become an angular units rough estimate $\phi_{dom,rough}$. This block 335 conversion of spatial units to angular units may be substantially similar to the process described above for block 150. Method 300 then proceeds to block 340, which involves estimating a phase offset term $\theta$ based on the equation (1) model, the block 318 DC component $I_{bg}$ and a portion of the measured intensity data 34 ($I_{meas,m}$) corresponding to the block 325 processing window [$m_{max}-\Delta_1$, $m_{max}+\Delta_2$]. The block 340 phase offset term may be referred to as $\theta_{dom}$ to indicate that it corresponds to the dominant (R or T) component.

It should be understood that an equation having the form of the equation (1) model may be used to model the measured intensity data 34 ($I_{meas,m}$) corresponding to the block 325 processing window [$m_{max}-\Delta_1$, $m_{max}+\Delta_2$], since it is assumed that the measured intensity data 34 ($I_{meas,m}$) corresponding to the block 325 processing window [$m_{max}-\Delta_1$, $m_{max}+\Delta_2$] principally comprises data from the dominant one of the R and T components. The block 340 process for determining the phase offset $\theta_{dom}$ may be substantially similar to that of block 155 described above, where $\theta$ of equation (1) is replaced with $\theta_{dom}$. More particularly, the block 340 process may comprise a curve fitting optimization technique performed in the spatial domain (i.e. without requiring a Fourier transform to the frequency domain). In one particular embodiment, the block 340 curve fitting optimization technique comprises a least squares technique, although a variety of other curve fitting optimization techniques could be used in block 340. The cost function of the block 340 optimization process may be selected, such that for each frame m in the processing window, the cost function is weighted by the corresponding value of the block 327 processing envelope function $M^*_{tot,m}(x_i, y_i)$ for the $m^{th}$ frame. The output of block 340 is a phase offset $\theta_{dom}$ corresponding to the dominant (R or T) component.

Method 300 then proceeds to block 345 which involves unwrapping the block 340 phase offset $\theta_{dom}$. The block 345 unwrapping process may be substantially similar to that of block 160 described above and may result in an integer value p corresponding to the number of complete $2\pi$ periods in the quantity $\phi_{dom,rough}-\theta_{dom}$, where $\phi_{dom,rough}$ represents the block 335 rough estimate (in angular units) and $\theta_{dom}$ is the block 340 phase offset or may result in a remainder quantity v where $v=(\phi_{dom,rough}-\theta_{dom})$ modulo $2\pi$. In block 350, method 300 obtains a fine profile estimate $\phi_{dom,fine}$ (in angular units). Block 350 may be performed in a manner substantially similar to that of block 165 described above and may involve using equation (16a) and/or (16b) to determine the angular units fine profile estimate $\phi_{dom,fine}$. In block 355, method 300 converts the block 350 angular fine profile estimate $\phi_{dom,fine}$ into spatial units to obtain a spatial units fine profile estimate $z_{dom,fine}$. This may be accomplished in a manner substantially similar to that of block 170 described above. The resulting block 355 fine profile estimate $z_{dom,fine}$ may be used to help determine the thickness t of film 212 as discussed in more detail below.

In the case where the amplitude of the R component interference is dominant over the amplitude of the T component interference, the block 355 fine profile estimate $z_{dom,fine}$ may represent the surface profile at various (x,y) locations for surface 218 of film 212. In the other case, where the amplitude of the T component interference is dominant over the amplitude of the R component interference, the block 355 fine profile estimate $z_{dom,fine}$ may represent the surface profile at various (x,y) locations for surface 220 at the interface between substrate 214 and film 212.

Method 300 proceeds from block 355 to either method 300A (FIG. 9A) or method 300B (FIG. 9B). The decision as to whether to use method 300A (FIG. 9A) or method 300B (FIG. 9B) may depend on whether sample 12 includes a reference surface 216 (i.e. whether a portion 216 of substrate 214 is exposed as shown in FIG. 6A) or whether substrate 214 of sample 12 is completely coated by film 212 (FIG. 6B). Method 300A (FIG. 9A) does not rely on a reference surface 216 and may be used in the circumstances of FIG. 6B—i.e. where substrate 214 is completely coated by film 212. Method 300B (FIG. 9B) requires a reference surface 216. It will be appreciated that method 300A could also be used where a reference surface 216 was available.

When using method 300A, method 300 proceeds from block 355 (FIG. 8) to block 360A (FIG. 9A). Method 300A shown schematically in FIG. 9A represents one particular embodiment for ascertaining the film thickness t(x,y). Method 300A begins in block 360A, which comprises fitting the block 327 processing window envelope $M^*_{tot,m}(x_i, y_i)$ to a Gaussian function. As is well known to those skilled in the art, a Gaussian function may be parameterized by its amplitude, its central location (mean) and its width (deviation). The block 360A Gaussian fitting process may comprise a least squares curve fitting process or any other suitable curve fitting process. The result of the block 360A Gaussian curve fitting process is a Gaussian function that approximates the block 327 processing window envelope.

Figure 10:
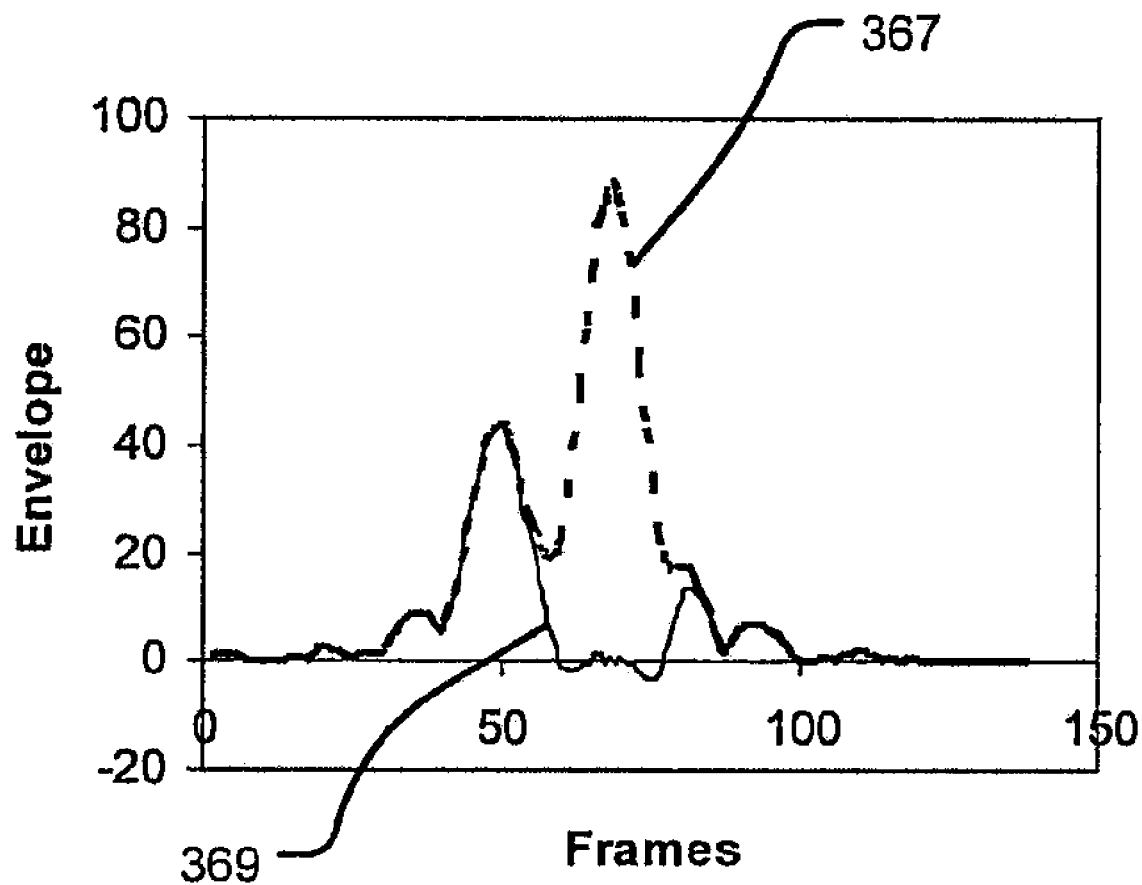
FIG. 10 is a schematic depiction of a process for removing a Gaussian envelope estimate from the combined envelope according to the method of FIG. 9B.

Method 300A then proceeds to block 365A which involves subtracting the block 360A Gaussian function from the block 320 combined envelope $M_{tot,m}(x_i,y_i)$. The result of the block 365A subtraction may be referred to as an intermediate envelope ($M_{int,m}(x_i,y_i)$). The block 365A intermediate envelope $M_{int,m}(x_i,y_i)$ may be representative of the interference contribution from the weaker one of the R and T components. FIG. 10 schematically depicts the block 365A subtraction. In the schematic illustration of FIG. 10, the thicker dashed line 367 represents the block 320 combined envelope $M_{tot,m}(x_i,y_i)$ and the thinner solid line 369 represents the block 365A intermediate envelope $M_{int,m}(x_i,y_i)$—i.e. after subtraction of the block 360A Gaussian function.

Method 300A may then proceed to optional block 367A which involves determining a frame $m_{int,max}$ corresponding to the maximum of the intermediate envelope $M_{int,m}(x_i,y_i)$. Block 367A may be similar in many respects to finding the frame $m_{max}$ corresponding to the maximum of the combined envelope $M_{tot,m}(x_i,y_i)$ in block 322, except that the intermediate envelope $M_{int,m}(x_i,y_i)$ is used in block 367A in the place of the combined envelope $M_{tot,m}(x_i,y_i)$ used in block 322.

After optional block 367A, method 300A may proceed to optional block 368A which involves using the frame $m_{int,max}$ to determine an intermediate processing window. In some embodiments, the block 368A intermediate processing window is defined by the range $[m_{int,max}-\Delta_{int,1}, m_{int,max}+\Delta_{int,2}]$, where $\Delta_{int,1}$, $\Delta_{int,2}$ represent integral numbers of frames. In some embodiments, $\Delta_{int,1}=\Delta_{int,2}=\Delta_{int}$.

The intermediate processing window $[m_{int,max}-\Delta_{int,1}, m_{int,max}+\Delta_{int,2}]$ may be relatively narrow in comparison to prior art techniques while achieving comparable results. In some embodiments, $\Delta_{int,1} \leq 10$ and $\Delta_{int,2} \leq 10$. In other embodiments, $\Delta_{int,1} \leq 5$ and $\Delta_{int,2} \leq 5$. In some embodiments, the width of the intermediate processing window $[m_{int,max}-\Delta_{int,1}, m_{int,max}+\Delta_{int,2}]$ is less than twice the central wavelength $\lambda_0$ of light source 14 in the spatial domain. In some embodiments, the width of the intermediate processing window $[m_{int,max}-\Delta_{int,1}, m_{int,max}+\Delta_{int,2}]$ is less than the central wavelength $\lambda_0$ of light source 14 in the spatial domain. This relatively narrow processing window for method 300A may be due to the incorporation of phase information $\theta_{int}$ into the block 370A intermediate profile estimation as explained in more detail below.

For method 300A, the width of the intermediate processing window $[m_{int,max}-\Delta_{int,1}, m_{int,max}+\Delta_{int,2}]$ may also be independent of the film thickness and/or the sampling interval. The width of the width of the intermediate processing window $[m_{int,max}-\Delta_{int,1}, m_{int,max}+\Delta_{int,2}]$ may, however, depend on fringe contrast. Typically, the fringe contrast for the intermediate component will be less than that of the dominant component. Consequently, in some embodiments, the block 368A intermediate processing window may be wider (i.e. more frames/samples) than the dominant component processing window of block 325. In other embodiments, the number of data used in the block 368A intermediate processing window may be the same as the number of data used in the block 325 processing window. In some embodiments, the ratio of the number of samples in the block 368A intermediate processing window to the fringe contrast is in a range of 5-75. In some embodiments, this range may be 8-25.

Method 300A then proceeds to optional block 369A which involves determining an intermediate processing window envelope $M^*_{int,m}(x_i, y_i)$. Block 369A may be similar to block 327 and the block 369A intermediate processing window envelope function $M^*_{int,m}(x_i, y_i)$ may be determined in accordance with equation (22*):

$$M^*_{int,m}(x_i, y_i) = \begin{cases} M_{int,m}(x_i, y_i) & \text{for } m_{int,max} - \Delta_{int,1} \leq m \leq m_{int,max} + \Delta_{int,2} \\ 0 & \text{otherwise} \end{cases} \quad (22^*)$$

Method 300A then proceeds to block 370A. In the illustrated embodiment, block 370A comprises obtaining profile information based on the measured intensity data 34 ($I_{meas,m}$) corresponding to the intermediate processing window envelope $M^*_{int,m}(x_i, y_i)$. In embodiments which do not include optional blocks 367A, 368A, 369A, block 370A may use the block 365A intermediate envelope $M_{int,m}(x_i,y_i)$ in place of the intermediate processing window envelope $M^*_{int,m}(x_i, y_i)$ to obtain the profile information. For the remainder of this description, it is assumed that method 300A uses the intermediate processing window envelope $M^*_{int,m}(x_i, y_i)$ without loss of generality.

The block 370A profile information may include a rough z dimension profile estimate for the intermediate envelope ($z_{int,rough}$) and/or a fine z dimension profile estimate for the intermediate envelope ($z_{int,fine}$). The block 370A intermediate profile estimate(s) ($z_{int,rough}$ and/or $z_{int,fine}$) may be obtained in a manner substantially similar to profiling method 100 (FIG. 4). In some embodiments, the block 370A intermediate profile information includes only the rough profile estimate $z_{int,rough}$ (similar to the rough profile estimate obtained in block 145 (FIG. 4)) and need not include the fine profile information obtained using the phase offset $\theta$. In other embodiments, block 370A involves carrying out method 100 completely to obtain both a rough profile intermediate estimate $z_{int,rough}$ and a fine profile intermediate estimate $z_{int,fine}$.

In the case where the amplitude of the R component interference is dominant over the amplitude of the T component interference, the block 370A intermediate profile estimate(s) ($z_{int,rough}$ and/or $z_{int,fine}$) may represent the surface profile at various (x,y) locations for surface 220 at the interface between substrate 214 and film 212. In the other case, where the amplitude of the T component interference is dominant over the amplitude of the R component interference, the block 370A intermediate profile estimate(s) ($z_{int,rough}$ and/or $z_{int,fine}$) may represent the surface profile at various (x,y) locations for surface 218 of film 212.

Method 300A then proceeds to block 375A which involves subtracting the block 370A intermediate envelope profile estimates ($z_{int,rough}$ and/or $z_{int,fine}$) from the block 330 rough profile estimate $z_{dom,rough}$ and/or the block 355 fine profile estimate $z_{dom,fine}$, as the case may be. The block 375A subtraction operation may be performed for each location (x, y) of interest. The result of the block 375A subtraction includes, for each (x,y) of interest, an absolute value rough difference value $DIFF_{rough}$ (in the case of subtracting the block 370A rough reference profile $z_{int,rough}$ from the block 330 rough profile estimate $z_{dom,rough}$) and/or an absolute value fine difference value $DIFF_{fine}$ (in the case of subtracting the block 370A fine reference profile $z_{int,fine}$ from the block 355 fine profile estimate $z_{dom,fine}$). The block 375A absolute value difference values $DIFF_{fine}$ and/or $DIFF_{rough}$ may be referred to as the fine and rough difference profiles.

Method 300A may then proceed to block 380A which involves dividing the block 375A difference profile ($DIFF_{fine}$ and/or $DIFF_{rough}$) by the factor $N(k_0)$ where $N(k_0)$ is the group refractive index of film 212 and $N(k_0)=N(k_0)=\alpha k_0$ (see equation 19) to obtain an estimate of the thickness $t(x,y)$ of film 212. The result of the block 380A division is the estimated film thickness for each particular location (x,y):

$$t_{rough}(x, y) = \frac{DIFF_{rough}(x, y)}{N(k_0)} \text{ or } t_{fine}(x, y) = \frac{DIFF_{fine}(x, y)}{N(k_0)},$$

as the case may be.

By applying method 300A for measuring the film thickness of a silicon dioxide film with nominal value of 943 nm, the average fine thickness $t_{fine}(x,y)$ experimentally obtained by the inventor over the field of view ranges from about 943 nm to 945 nm for various parts of a 4" wafer, and the RMS of the film thickness $t_{fine}(x,y)$ is 1 to 2 nm. The closeness of measurements with the film nominal value shows that method 300 can be applied to the cases where the available interference data are less than those used in the prior art techniques. As discussed above, even if the rough thickness $t_{rough}(x,y)$ based on the centroid is less accurate and/or has less resolution because of the use of fewer interference data samples, the fine film thickness $t_{fine}(x,y)$ which incorporates the phase information still provides accurate results. As discussed above, this may be due to the fact that the optimized phase information is less sensitive to the number of data samples and the sampling spacing than envelope-based techniques.

Comparing the experimentally determined results with the nominal value of a 943 nm film, suggests that the film thicknesses $t_{fine}(x,y)$ estimated using method 300, 300A show small dispersion effects which result in the estimate that is slightly larger than the nominal thickness of 943nm. For thicker films, the dispersion effects in phase may be considered. We may optionally add/subtract a dispersion offset that is calculated in a theoretical model like equation (19) by using the film thickness found when dispersion effect is not completely considered. This factor is referred as calibration offset and may be added to/subtracted from the fine estimate $t_{fine}(x, y)$ as shown in block 385A in FIG. 9A to obtain a further revised thickness estimate $t_{fine,disp}(x,y)$.

Thus, at its conclusion, method 300 (including method 300A) yields one or more thickness estimates ($t_{rough}(x,y)$, $t_{fine}(x,y)$) for film 212 at various locations (x,y). As discussed above, the block 355 fine profile estimate $Z_{dom,fine}$ and the block 370A fine intermediate profile estimate $Z_{int,fine}$ may represent z dimension profile information for various locations (x,y) on surface 218 of film 212 and on surface 220 between substrate 214 and film 212. Similarly, the block 330 rough profile estimate $Z_{dom,rough}$ and the block 370A intermediate rough profile estimate $Z_{int,rough}$ may also represent low resolution z dimension profile information for various locations (x,y) on surface 218 of film 212 and on surface 220 between substrate 214 and film 212. The fine profile estimates (which take optimized phase information into account) do not exhibit resolution degradation due to the windowing process (i.e. the block 355 fine profile estimate $Z_{dom,fine}$ and the block 370A fine intermediate profile estimate $Z_{int,fine}$ exhibit superior resolutions (e.g. 1-2 nm) compared to those of prior art techniques even with small processing windows). In experimental results conducted on a silicon oxide film (of nominal thickness 943 nm) on silicon substrate, the inventor has used method 300 (including method 300A) to estimate the film thickness to be 945 nm with RMS resolution less than 1.7 nm.

In circumstances where there is a reference surface 216 available (e.g. FIG. 6A), method 300 may make use of method 300B (FIG. 9B) in addition to or as an alternative to method 300A (FIG. 9A). For example, method 300B may be used to reduce processing resources by avoiding the need find an intermediate profile. When using method 300B, method 300 proceeds from block 355 (FIG. 8) to block 360B (FIG. 9B). Block 360B involves obtaining profile information for reference surface 216. The block 360B reference surface profile may include a rough z dimension estimate of the profile of reference surface 216 ($z_{ref,rough}$) and/or a fine z dimension estimate of the profile of reference surface 216 ($z_{rej,fine}$). The block 360B reference surface profile estimate(s) ($z_{ref,rough}$ and/or $z_{ref,fine}$) may be obtained in a manner substantially similar to profiling method 100 (FIG. 4), but the block 360B profiling process may be restricted to (x, y) locations that are known to correspond with reference surface 216 (FIG. 6A). In some embodiments, the block 360B reference surface profile includes only the rough profile estimate $z_{ref,rough}$ (similar to the rough profile estimate obtained in block 145 (FIG. 4)) and need not include the fine profile information obtained using the phase offset θ. In other embodiments, block 360B involves carrying out method 100 completely to obtain both a rough profile reference surface estimate $z_{ref,rough}$ and a fine profile reference surface estimate $z_{ref,fine}$ for reference surface 216.

Method 300B then proceeds to block 365B, which involves computing an average of the block 360B reference surface profile. Block 365B may include computing one or both of an average rough profile reference surface estimate $z_{ref,rough,avg}$ and an average fine profile reference surface estimate $z_{ref,fine,avg}$. In particular embodiments, block 365B may comprise obtaining average(s) of the block 360B reference surface profiles for a number of (x, y) locations known to be on reference surface 216. In particular embodiments, the (x, y) locations used for the block 365B average(s) are spaced apart from one another by at least 25% of the dimension of reference surface 216. In other embodiments, the (x, y) locations used for the block 365B average(s) include all of the available locations (x,y) known to be on reference surface 216. In some embodiments, the block 365B average(s) may be weighted such that (x, y) locations away from boundaries (e.g. away from the boundary of film 212 and the edges of sample 12) are given greater weight.

Method 300B then proceeds to block 370B which involves subtracting the block 365B average reference surface profile (i.e. either $z_{ref,roug,avg}$ or $z_{ref,fine,avg}$) from the block 330 rough profile estimate ($z_{dom,rough}$) or the block 355 fine profile estimate ($z_{dom,fine}$), as the case may be and taking the absolute value of the result. The block 370B subtraction operation may be performed for each location (x, y) where substrate 214 is covered by film 212. After taking the absolute value of the difference obtained by this subtraction, the result of block 370B includes, for each (x,y) of interest, a rough absolute value difference $DIFF_{rough}$ (in the case of obtaining the difference between the block 365B rough reference profile $z_{ref,rough,avg}$ and the block 330 rough profile estimate $z_{dom,rough}$) and/or a fine absolute value difference $DIFF_{fine}$ (in the case of obtaining the difference between the block 365B fine reference profile $z_{ref,fine,avg}$ and the block 355 fine profile estimate $z_{dom,fine}$). The block 370B absolute value differences $DIFF_{fine}$ and/or $DIFF_{rough}$ may be referred to as the fine and rough difference profiles.

Method 300B then proceeds to block 375B which involves ascertaining whether the T component or the R component is the dominant contributor to the interference signal of intensity data 34. Referring to plot 226 of FIG. 7C, it can be seen that plot 226 comprises a pair of interference signals 226A, 226B and that interference signal 226A is dominant with respect to interference signal 226B. In plot 226, interference signal 226B corresponds to the R component and interference signal 226A corresponds to the T component. In the configuration of the illustrated embodiment, the interference contribution 226B from the R component will typically lead the interference contribution 226A from the T component where the film has an index of refraction greater than air (i.e. the interference contribution from the R component will typically be to the left of the interference contribution from the T component in the illustrated plots). This occurs because of the relatively long optical path length of the T component (i.e. through film 212) relative to that of the R component. In other interferometer configurations, the interference contribution from the R component may follow that of the T component. However, in any configuration, it will be known which of the R and T component interference contributions leads the other.

Based on this knowledge, it can be determined in block 375B whether the R component or the T component is dominant. For example, in FIG. 7C it can be seen that plot 226 has a leading interference signal (R component) that is smaller in amplitude than the following interference signal (T component). Thus, in FIG. 7C, the T component has a larger amplitude and block 375B concludes that the T component is the dominant component. In some applications, the leading interference signal (R component) will have a greater amplitude than the following interference signal (T component). In such circumstances, block 375B concludes that the R component is the dominant component. The block 375B inquiry may be automated using a thresholding process (e.g. to determine if the interference signal rises faster (indicating dominance of the leading R component) or falls faster (indicating dominance of the following T component).

If the block 375B inquiry concludes that the R component is dominant (block 375B NO output), then method 300B proceeds to block 385B. Block 385B involves concluding that the block 370B absolute value difference profile ($DIFF_{rough}$ or $DIFF_{fine}$) itself represents the thickness ($t_{rough}$(x,y) or $t_{fine}$(x,y)) of film 212 at each particular location (x,y). If it desired to have a low resolution estimate of the film thickness $t_{rough}$(x,y), then block 385B may comprise setting $t_{rough}$(x,y)=$DIFF_{rough}$(x,y). The advantage of the low resolution film thickness estimate $t_{rough}$(x,y)=$DIFF_{rough}$(x,y) is that it requires less computational resources. If it desired to have a high resolution estimate of the film thickness $t_{fine}$(x,y), then block 385B may comprise setting $t_{fine}$(x,y)=$DIFF_{fine}$(x,y). Using the fine difference values $DIFF_{fine}$(x,y) results in a higher resolution estimate.

If the block 375B inquiry concludes that the T component is dominant (block 375B YES output), then method 300B proceeds to block 380B. Block 380B involves dividing the block 370B difference profile ($DIFF_{rough}$ or $DIFF_{fine}$) by a factor $N(k_0)-1$, where $N(k_0)$ is the group refractive index of film 212 and $N(k_0)=n(k_0)+\alpha k_0$ (see equation (19)). The result of the block 380B division is the estimated film thickness $$t_{rough}(x, y) = \frac{DIFF_{rough}(x, y)}{N(k_0) - 1} \text{ or } t_{fine}(x, y) = \frac{DIFF_{fine}(x, y)}{N(k_0) - 1},$$

as the case may be. Obtaining a high resolution film thickness estimate $t_{fine}$(x,y) may involve additional computational resources.

Comparing the film thickness $t_{fine}$(x,y) found in method 300A with that in 300B, the resolution is similar, but there may be a offset on the order of 10 nm from the results of 300B for a nominal film thickness of 943 nm. A possible explanation is in the model to subtract the average of the reference surface 216, which nevertheless is not the true difference between the profiles of surface 218 and interface surface 220. In the case where the T component is the dominant component, it is possible to estimate its dispersion effect for a thicker film using a theoretical model as described above. In other embodiments, where the T component is the dominant component, it is possible to experimentally estimate the dispersion effect. The theoretically determined or experimentally determined dispersion offset may be added to/subtracted from the block 380B film thickness $t_{fine}$(x,y) in block 395B to obtain a further revised thickness estimate $t_{fine,disp}$(x,y).

In the case where the T component is dominant and method 300B involves determining a high resolution thickness estimate $t_{fine}$(x,y), method 3003B may comprise optional dispersion offset blocks 390B and 395B. The dispersion effect (referred to here as disp_off) may be estimated from experimental data. In one particular embodiment, optional block 390B may comprise obtaining an average rough estimate thickness estimate $t_{rough,avg}$ and an average fine estimate thickness $t_{fine,avg}$ over a plurality of (x,y) values. Advantageously, the rough estimate $t_{rough}$ and its corresponding average $t_{rough,avg}$ are not influenced by the dispersion effect. The difference between these rough and fine estimates (disp_off=$t_{fine,avg}-t_{rough,avg}$) represents a dispersion offset parameter disp_off that is independent of (x,y). Optional block 395B may involve adding/subtracting the dispersion offset parameter disp_off to/from the high resolution thickness estimate $t_{fine}$(x,y) at each location (x,y) to obtain a dispersion calibrated high resolution thickness estimate $t_{fine,disp}$(x,y). In other embodiments, the dispersion effect disp_off may be determined experimentally and may be added/subtracted from the high resolution thickness estimate $t_{fine}$(x,y) at each location (x,y) to obtain a dispersion calibrated high resolution thickness estimate $t_{fine,disp}$(x,y).

Thus, at its conclusion, method 300 (including method 300B) yields one or more thickness estimates ($t_{rough}(x,y)$, $t_{fine}(x,y)$ and/or $t_{fine,disp}(x,y)$) for film 212 at various locations (x,y). As discussed above, the block 355 fine profile estimate $z_{dom,fine}$ may represent a z dimension profile information for various locations (x,y) on surface 218 of film 212 or on surface 220 between substrate 214 and film 212. It will be appreciated that the block 330 rough profile estimate $z_{dom,rough}$ may also represent a low resolution z dimension profile for various locations (x,y) on surface 218 of film 212 or on surface 220 between substrate 214 and film 212 (depending on whether the R component or the T component dominates the interference pattern). The resolution of the rough profile estimates may be degraded by the windowing process of method 300, but the fine profile estimates (which take optimized phase information into account) do not exhibit comparable resolution degradation due to the windowing process.

Comparing method 300 (including method 300A or method 300B) with prior art Fourier transform techniques demonstrates a number of the advantages of method 300. Firstly, method 300 is performed entirely in the spatial domain and requires no transforms to the spatial frequency domain. Additionally, as discussed briefly above, a Fourier transform typically requires integration that extends to $\pm\infty$. This is always a problem for Fourier transform techniques, as it is not possible to extend the integration boundaries to $\pm\infty$. Also, however, when a thresholding process is applied to the interference data to separate the R and T interference components, the resultant interference signal (and the corresponding integral boundaries) are even shorter. Consequently, the resolution achievable using Fourier transform techniques to determine film thickness decreases dramatically and fringe print-through artefacts become more prominent. For example, on the silicon oxide film (of nominal thickness 943 nm) on silicon substrate, the inventor has experimentally determined the RMS resolution obtainable from Fourier transform techniques to be on the order of 4.6 nm which is significantly worse than that of method 300 (using method 300A or method 300B).

Certain implementations of the invention comprise computer processors which execute software instructions which cause the processors to perform a method of the invention. For example, one or more processors in a dual modulation display system may implement data processing steps in the methods described herein by executing software instructions retrieved from a program memory accessible to the processors. The invention may also be provided in the form of a program product. The program product may comprise any medium which carries a set of computer-readable instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The instructions may be present on the program product in encrypted and/or compressed formats.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

Interferometer 10 represents one possible embodiment for using white light to obtain intensity data 34 having the interference profile 50 of FIG. 2B. It will be appreciated by those skilled in the art that other interferometer designs provide similar intensity data with similar interference profiles. Such other interferometers may comprise different illumination designs. The inventive methods and systems described herein are useable in conjunction with such other interferometers.

In the above described embodiments, movement mechanism 42 is connected to move sample 12 in the z direction. In general, movement mechanism 42 may be connected to move any component(s) of interferometer 10 so as to change the relative optical path lengths of light 20F that is reflected from sample 12 and light 20E that is reflected from reference surface 26.

The description set out above describes the use of the invention in conjunction with a Mirau interferometer 10. However, various embodiments of the invention may be used in conjunction with other vertical scanning interferometers, such as Michelsen, Linnik or Fizeau interferometers.

Those skilled in the art will appreciate that block 140 of method 100 is optional and that method 100 could proceed assuming that the interferometer contrast term V(x, y) is part of the envelope.

In the above described embodiments, the curve-fitting optimization used to fit the measured data to the model and extract the phase term $\theta(x_i, y_i)$ is a least squares curve fitting technique. The invention is not limited to least squares curve fitting. In general, any suitable curve fitting optimization technique in the spatial domain may be employed to estimate the phase term $\theta(x_i, y_i)$ using the measured data and the model in the spatial domain.

As discussed above, method 300 (including method 300A) is used for situations where there is no reference surface 216 available (i.e. film 212 completely covers the region of interest of substrate 214). In the application of method 300 (including method 300A), it is possible to obtain estimates for the thickness t(x,y) of film 212, the profile of surface 218 of film 212 and the profile of surface 220 at the interface between substrate 214 and film 212. In contrast, method 300 (including method 300B) is used for situations where a reference surface 216 is available (i.e. a portion of substrate 214 is exposed). In the application of method 300 (including method 300B), it is possible to obtain estimates for the thickness t(x,y) of film 212 and the profile of one of surface 218 of film 212 or surface 220 at the interface between substrate 214 and film 212. Those skilled in the art will appreciate that the relevant portions of method 300 (including method 300A) may be used if it desired to obtain estimate of the profiles of both surface 218 and surface 220.

In the illustrated embodiments, particular blocks of the illustrated methods are shown in particular order to facilitate ease of explanation. In many cases, it may be possible to rearrange the order of these blocks. In some embodiments, some of the procedures associated with these blocks may be performed in parallel or partially in parallel with one another.

What is claimed is:

1. A method for estimating a surface profile of a sample in an interferometer having a broad bandwidth light source, the method comprising, for each location (x,y) of interest on the sample:
   detecting interference pattern intensity data over a series of frames of a relative scan between the sample and a reference surface;
   determining an envelope of the detected intensity data based on amplitudes of the detected intensity data;
   determining a rough estimate $z_{rough}$ of the surface profile of the sample at the location (x,y) of interest based on the envelope;
   estimating a phase offset $\theta$ of the detected intensity data using a curve fitting optimization process to fit the detected intensity data to a broad bandwidth interference model; and
   refining the rough estimate $z_{rough}$, of the surface profile using the phase offset $\theta$ to obtain a fine estimate $z_{fine}$ of the surface profile of the sample at the location (x,y) of interest, the fine estimate $z_{fine}$ having improved resolution over the rough estimate $z_{rough}$.

2. A method according to claim 1 comprising, prior to using the curve fitting optimization process, estimating a DC component of the detected intensity data and subtracting the DC component from the detected intensity data to obtain DC offset intensity data.

3. A method according to claim 2 wherein estimating the DC component comprises taking an average of: detected intensity data corresponding a first plurality of frames spaced apart, in a first direction, from an interference pattern in the detected intensity data; and detected intensity data corresponding to a second plurality of frames spaced apart, in a second direction opposed to the first direction, from the interference pattern.

4. A method according to claim 2 comprising, prior to using the curve fitting process, removing a DC term from the broad bandwidth interference model to obtain a DC offset model and wherein using the curve fitting optimization process comprises minimizing a cost function, the cost function relating the DC offset intensity data to the DC offset model.

5. A method according to claim 4 wherein DC offset model has a form $I^*_m = M_m \cos[2\pi k_0(2m\Delta z)+\theta]$ where m is a frame index, $I^*_m$ is a value for the $m^{th}$ frame of the DC offset model, $M_m$ is an envelope term for the $m^{th}$ frame of the DC offset model, $\Delta z$ is an inter-frame separation, $k_0$ is a central wavenumber of the broad bandwidth light source and $\theta$ is the phase offset which is independent of the frame index m.

6. A method according to claim 4 wherein for each frame m of the series of frames, the DC offset intensity data is weighted by a corresponding value $M_m$ of the envelope for the $m^{th}$ frame.

7. A method according to claim 1 wherein estimating the phase offset $\theta$ comprises obtaining a phase value with a $2\pi$ ambiguity and wherein refining the rough estimate $z_{rough}$ of the surface profile using the phase offset $\theta$ comprises unwrapping the phase offset $\theta$ to remove the $2\pi$ ambiguity from the phase value.

8. A method according to claim 7 wherein unwrapping the phase offset involves determining at least one of: an integer p and a value v in a range $0 \leq v \leq 2\pi$, in the equation $\phi_{rough} - \theta = p2\pi + v$, where $\phi_{rough}$ is the rough estimate $z_{rough}$ expressed in angular phase units corresponding to a central wavelength $\lambda_0$ of the broad bandwidth light source.

9. A method according to claim 8 wherein refining the rough estimate $z_{rough}$ of the surface profile using the phase offset $\theta$ comprises determining a fine estimate in phase units $\phi_{fine}$ according to one of: $\phi_{fine} = 2\pi p + \theta$ and $\phi_{fine} = \phi_{rough} - v$.

10. A method according to claim 9 comprising converting the fine estimate in angular phase units $\phi_{fine}$ to the fine estimate $z_{fine}$ in spatial units corresponding to the central wavelength $\lambda_0$ of the broad bandwidth light source.

11. A method according to claim 1 wherein determining the rough estimate $z_{rough}$ of the surface profile of the sample comprises calculating a centroid of the envelope and setting the rough estimate $z_{rough}$ to be equal to the centroid of the envelope.

12. A method for characterizing a sample comprising a film applied to a substrate in an interferometer having a broad bandwidth light source, the method comprising, for each location (x,y) of interest on the sample:
    detecting interference pattern intensity data over a series of frames of a relative scan between the sample and a reference surface;
    determining a combined envelope of the detected intensity data based on amplitudes of the detected intensity data, the combined envelope comprising a combination of: a R interference pattern corresponding to light reflected from an exposed surface of the film; and a T interference pattern corresponding to light reflected from an interface between the substrate and the film;
    ascertaining a frame $m_{max}$ corresponding to a maximum of the combined envelope;
    using the frame $m_{max}$ to determine: a processing window, the processing window comprising a plurality of frames in the range $[m_{max} - \Delta_1, m_{max} + \Delta_2]$, where $\Delta_1$ and $\Delta_2$ comprise integer numbers of frames; and a processing window envelope, the processing window envelope corresponding to the combined envelope in the processing window and having a value of zero outside of the processing window;
    determining, based on the processing window envelope, an estimate $z_{dom}$ of a first surface profile at the location (x,y) of interest;
    using the estimate $z_{dom}$ of the first surface profile to estimate a thickness t(x,y) of the film at the location of interest.

13. A method according to claim 12 wherein determining, based on the processing window envelope, the estimate $z_{dom}$ of the first surface profile comprises determining a centroid of the processing window envelope and setting the estimate $z_{dom}$ of the surface profile to be equal to the centroid of the processing window envelope.

14. A method according to claim 13 comprising:
    estimating a phase offset $\theta_{dom}$ of a portion of the detected intensity data corresponding to the frames of the processing window envelope using a curve fitting optimization process to fit the portion of the detected intensity data corresponding to the frames of the processing window envelope to a broad bandwidth interference model;
    unwrapping the phase offset $\theta_{dom}$ to remove a $2\pi$ ambiguity therefrom and to obtain an unwrapped phase offset; and
    refining the estimate $z_{dom}$ of the surface profile using the unwrapped phase offset to obtain a fine estimate $z_{dom,fine}$ of the surface profile at the location (x,y) of interest, the fine estimate $z_{dom,fine}$ having improved resolution over the rough estimate $z_{dom}$.

15. A method according to claim 14 wherein using the curve fitting optimization process to fit the portion of the detected intensity data corresponding to the frames of the processing window envelope to the broad bandwidth interference model comprises minimizing a cost function which, for each frame m in the processing window envelope, relates the detected intensity data to the broad bandwidth interference model and wherein minimizing the cost function comprises, for each frame m in the processing window envelope, weighing the detected intensity data by a corresponding value of the combined envelope for the $m^{th}$ frame.

16. A method according to claim 12 wherein a number of the plurality of frames in the processing window $[m_{max}-\Delta_1, m_{max}+\Delta_2]$ is independent of the thickness $t(x,y)$ of the film.

17. A method according to claim 12 wherein a width of the processing window $[m_{max}-\Delta_1, m_{max}+\Delta_2]$ is less than twice a central wavelength $\lambda_0$ of the broad bandwidth light source in a spatial domain.

18. A method according to claim 12 wherein using the estimate $z_{dom}$ of the first surface profile to estimate the thickness $t(x,y)$ of the film comprises:
   estimating an average surface profile $z_{ref,avg}$ of a reference surface of the substrate, the reference substrate surface located away from the film; and
   determining a difference between the estimate $z_{dom}$ of the surface profile and the average surface profile $z_{ref,avg}$ of the reference substrate surface and using the difference to estimate a thickness $t(x,y)$ of the film at the location $(x,y)$ of interest.

19. A method according to claim 18 wherein using the difference to estimate the thickness $t(x,y)$ of the film at the location $(x,y)$ of interest comprises:
   if the R interference pattern is a dominant one of the R interference pattern and the T interference pattern, then using the difference as the estimate of the thickness $t(x,y)$ of the film at the location $(x,y)$ of interest; and
   if the T interference pattern is a dominant one of the R interference pattern and the T interference pattern, then dividing an absolute value of the difference by a factor $N(k_0)-1$, where $N(k_0)$ is a group refractive index of the film and $k_0$ is a central wavenumber of the broad bandwidth light source, to obtain the estimate of the thickness $t(x,y)$ of the film at the location $(x,y)$ of interest.

20. A method according to claim 18 comprising estimating a surface profile of at least one of the exposed surface of the film and the interface between the film and the substrate, wherein:
   if the R interference pattern is a dominant one of the R interference pattern and the T interference pattern, then the estimate $z_{dom}$ of the first surface profile at the location $(x,y)$ of interest represents an estimate of the surface profile of the exposed surface of the film; and
   if the T interference pattern is the dominant one of the R interference pattern and the T interference pattern, then the estimate $z_{dom}$ of the first surface profile at the location $(x,y)$ of interest represents an estimate of the interface between the substrate and the film.

21. A method according to claim 12 wherein using the estimate $z_{dom}$ of the first surface profile to estimate the thickness $t(x,y)$ of the film comprises:

fitting the processing window envelope to a Gaussian function;
subtracting the Gaussian function from the combined envelope to determine an intermediate envelope;
determining, based on the intermediate envelope, a second estimate $z_{int}$ of a second surface profile at the location $(x,y)$ of interest; and
determining a difference between the first estimate $z_{dom}$ of the first surface profile and the second estimate $z_{int}$ of the second surface profile and using the difference to estimate a thickness $t(x,y)$ of the film at the location $(x,y)$ of interest.

22. A method according to claim 21 wherein using the difference to estimate the thickness $t(x,y)$ of the film at the location $(x,y)$ of interest comprises:
   if the R interference pattern is a dominant one of the R interference pattern and the T interference pattern, then dividing the difference by a factor $N(k_0)$, where $N(k_0)$ is a group refractive index of the film and $k_0$ is a central wavenumber of the broad bandwidth light source, to obtain the estimate of the thickness $t(x,y)$ of the film at the location $(x,y)$ of interest; and
   if the T interference pattern is a dominant one of the R interference pattern and the T interference pattern, then dividing an absolute value of the difference by the factor $N(k_0)$ to obtain the estimate of the thickness $t(x,y)$ of the film at the location $(x,y)$ of interest.

23. A method according to claim 21 comprising estimating a surface profile of at least one of the exposed surface of the film and the interface between the film and the substrate, wherein:
   if the R interference pattern is a dominant one of the R interference pattern and the T interference pattern, then the first estimate $z_{dom}$ of the first surface profile at the location $(x,y)$ of interest represents an estimate of the surface profile of the exposed surface of the film and the second estimate $z_{int}$ of the second surface profile at the location $(x,y)$ of interest represents an estimate of the surface profile of the interface between the substrate and the film; and
   if the T interference pattern is a dominant one of the R interference pattern and the T interference patter, then the first estimate $z_{dom}$ of the first surface profile at the location $(x,y)$ of interest represents an estimate of the interface between the substrate and the film and the second estimate $z_{int}$ of the second surface profile at the location $(x,y)$ of interest represents an estimate of the surface profile of the exposed surface of the film.

24. A computer program product comprising computer instructions which when executed by a suitably configured processor cause the processor to perform the method of claim 1.

25. A computer program product comprising computer instructions which when executed by a suitably configured processor cause the processor to perform the method of claim 12.

* * * * *